United States Patent
Lu et al.

(10) Patent No.: US 10,334,410 B2
(45) Date of Patent: Jun. 25, 2019

(54) BLUETOOTH COMMUNICATION METHOD AND COMMUNICATION DEVICE

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 15/940,934

(22) Filed: Mar. 29, 2018

(65) Prior Publication Data

US 2018/0220273 A1    Aug. 2, 2018

Related U.S. Application Data

(63) Continuation of application No. PCT/CN2016/099759, filed on Sep. 22, 2016.

(30) Foreign Application Priority Data

Oct. 15, 2015   (CN) .......................... 2015 1 0666316

(51) Int. Cl.
  *H04B 7/00*   (2006.01)
  *H04W 4/18*   (2009.01)
  *H04M 1/725*   (2006.01)
  *G06F 8/41*   (2018.01)
  (Continued)

(52) U.S. Cl.
  CPC .............. *H04W 4/18* (2013.01); *G06F 8/443* (2013.01); *G06F 9/4411* (2013.01);
  (Continued)

(58) Field of Classification Search
  CPC ....... H04W 4/80; H04W 88/02; H04W 40/02; H04W 64/00; H04W 28/16; H04W 4/18;
  (Continued)

(56) References Cited

U.S. PATENT DOCUMENTS

2014/0113267 A1    4/2014   St. Hilaire et al. ........... 434/362
2016/0366713 A1*   12/2016   Sonnino .................... G09G 5/12
(Continued)

FOREIGN PATENT DOCUMENTS

CN         102545968 A        7/2012
CN         103457642 A        12/2013
(Continued)

OTHER PUBLICATIONS

Liu, Yanwei, "Apple development Chinese website iOS Bluetooth development (second part): Implementing code for iOS connection peripheral" Website article: http://www.cocoachina.com/ios/20150917/13456.html ; (Sep. 2015).
(Continued)

*Primary Examiner* — Nhan T Le
(74) *Attorney, Agent, or Firm* — J.C. Patents

(57) ABSTRACT

Disclosed is a method and device for Bluetooth communication, the method including: initializing a center device object; obtaining a first device object corresponding to a device of Bluetooth 4.0 according to the center device; pairing with the device of Bluetooth 4.0 according to the first device object to obtain a second device object; obtaining a third device object according to the first or second device object; obtaining a target service corresponding to a preset service identification from the third device object; obtaining a first service according to the target service; obtaining target feature corresponding to a preset feature identification from the first service, realizing communicating with the device of Bluetooth 4.0 via the target feature. The target feature corresponding to the preset feature identification in the target Bluetooth device is obtained according to the center device, and communication with the target Bluetooth device is realized by using the target feature.

18 Claims, 4 Drawing Sheets

(51) Int. Cl.
  *H04L 12/24* (2006.01)
  *G06F 9/4401* (2018.01)
  *H04W 4/80* (2018.01)

(52) U.S. Cl.
  CPC .......... *H04L 41/082* (2013.01); *H04M 1/725* (2013.01); *H04M 1/7253* (2013.01); *H04W 4/80* (2018.02); *H04L 41/0853* (2013.01); *H04M 2250/02* (2013.01)

(58) Field of Classification Search
  CPC ...... G06F 3/1236; G06F 8/443; G06F 9/4411; H04L 41/082; H04M 1/7253; H04M 1/6066; H04M 2250/02
  See application file for complete search history.

(56) References Cited

U.S. PATENT DOCUMENTS

| | | | |
|---|---|---|---|
| 2017/0034646 A1* | 2/2017 | Song | H04W 8/005 |
| 2017/0048613 A1* | 2/2017 | Smus | H04M 1/7253 |
| 2017/0223486 A1* | 8/2017 | Abraham | H04W 76/14 |
| 2017/0353979 A1* | 12/2017 | Lee | H04W 8/24 |

FOREIGN PATENT DOCUMENTS

| | | |
|---|---|---|
| CN | 104038404 A | 9/2014 |
| CN | 104365173 A | 2/2015 |
| CN | 104797005 A | 7/2015 |
| CN | 105188023 A | 12/2015 |

OTHER PUBLICATIONS

The Chinese First Examination Report of corresponding China patent application No. 201510666316.9, dated Oct. 26, 2018.
The Chinese Search Report of corresponding China patent application No. 201510666316.9.
The International Search Report of corresponding International PCT Application No. PCT/CN2016/099759, dated Dec. 8, 2016.

* cited by examiner

BLUETOOTH COMMUNICATION METHOD AND COMMUNICATION DEVICE

CROSS-REFERENCE TO RELATED APPLICATIONS

This application is a continuation of International Application No. PCT/CN2016/099759, filed on Sep. 22, 2016, which claims priority to Chinese Patent Application No. 201510666316.9, filed on Oct. 15, 2015. The disclosures of the aforementioned applications are hereby incorporated by reference in their entireties.

FIELD OF THE DISCLOSURE

The present disclosure relates to communication field, more particularly, to a method of Bluetooth communication and a communication device.

BACKGROUND OF THE DISCLOSURE

Bluetooth Core Specification Version 4.0 is the most newly Bluetooth technology specification released by Bluetooth Special Interest Group and has features such as power-saving, low cost, low delay with 3 millisecond, ultra-long valid connecting distance and AES-128 encryption, etc. In the prior art, a mobile terminal cannot communicate well with a device with Bluetooth 4.0.

SUMMARY OF THE DISCLOSURE

Embodiments of the present disclosure provide a Bluetooth communication method and a communication device so as to solve a technical problem that a mobile terminal cannot communicate optimally with a device with Bluetooth 4.0.

According to an aspect of embodiments of the present disclosure, a method of Bluetooth communication is provided, which includes:

Step s1, initializing a center device object, and obtaining a first device object according to the center device object;

Step s2, pairing with a corresponding target Bluetooth device according to the first device object, and obtaining a second device object;

Step s3, obtaining a third device object according to the first device object or the second device object, and obtaining a target service corresponding to a preset service identification from the third device object;

Step s4, obtaining a first service according to the target service, obtaining a target feature corresponding to the preset feature identification from the first service, storing the target feature, and using the target feature to communicate with the target Bluetooth device.

According to another aspect of embodiments of the present disclosure, a communication device is provided, which includes: a center module, a first obtaining module, a pairing module, a second obtaining module, a third obtaining module, a fourth obtaining module, a fifth obtaining module, a sixth obtaining module, a storing module and a communicating module, where the center module is configured to initialize a center device object;

the first obtaining module is configured to obtain a first device object according to the center device object initialized by the center module;

the paring module is configured to pair with a corresponding target Bluetooth device according to the first device object obtained by the first obtaining module;

the second obtaining module is configured to obtain a second device object after the pairing module pairs with the corresponding target Bluetooth device according to the first device object obtained by the first obtaining module;

the third obtaining module is configured to, after the second obtaining module obtains the second device object, obtain a third device object according to the second device object or the first device object obtained by the first obtaining module;

the fifth obtaining module is configured to obtain a target service corresponding to a preset service identification from the third device object obtained by the third obtaining module;

the fourth obtaining module is configured to obtain a first service according to the target service obtained by the fifth obtaining module;

the sixth obtaining module is configured to obtain a target feature corresponding to a preset feature identification from the first service obtained by the fourth obtaining module;

the storing module is configured to store the target feature obtained by the sixth obtaining module; and the communicating module is configured to use the target feature stored by the storing module to communicate with the target Bluetooth device.

By the method of Bluetooth communication and the communication device provided by the embodiments of the present disclosure, the target feature corresponding to the preset feature identification in the target Bluetooth device is obtained according to the center device, and the target feature is used to implement communication with the target Bluetooth device.

BRIEF DESCRIPTION OF THE DRAWINGS

The technical solutions of the embodiments of the disclosure are described clearly and completely in conjunction with the accompanying drawings as follows. Apparently, the described drawings are merely a part of but not all of the embodiments according to the disclosure. Based on the described drawings of the disclosure, other drawings can be obtained by those of ordinary skill in the art without any creative work.

DETAILED DESCRIPTION

The technical solutions of the embodiments of the disclosure are described clearly and completely in conjunction with the accompanying drawings as follows. Apparently, the described drawings are merely a part of but not all of the embodiments according to the disclosure. Based on the described embodiment of the disclosure, other embodiments obtained by those of ordinary skill in the art without any creative work belong to the scope of the disclosure. It will be further understood that the terms "include" and/or "comprise", specify the presence of stated features, actions, integers, steps, operations, elements, and/or components, but do not preclude the presence or addition of one or more other features, actions, integers, steps, operations, elements, components, and/or combinations thereof.

Embodiment 1

Figure 1:
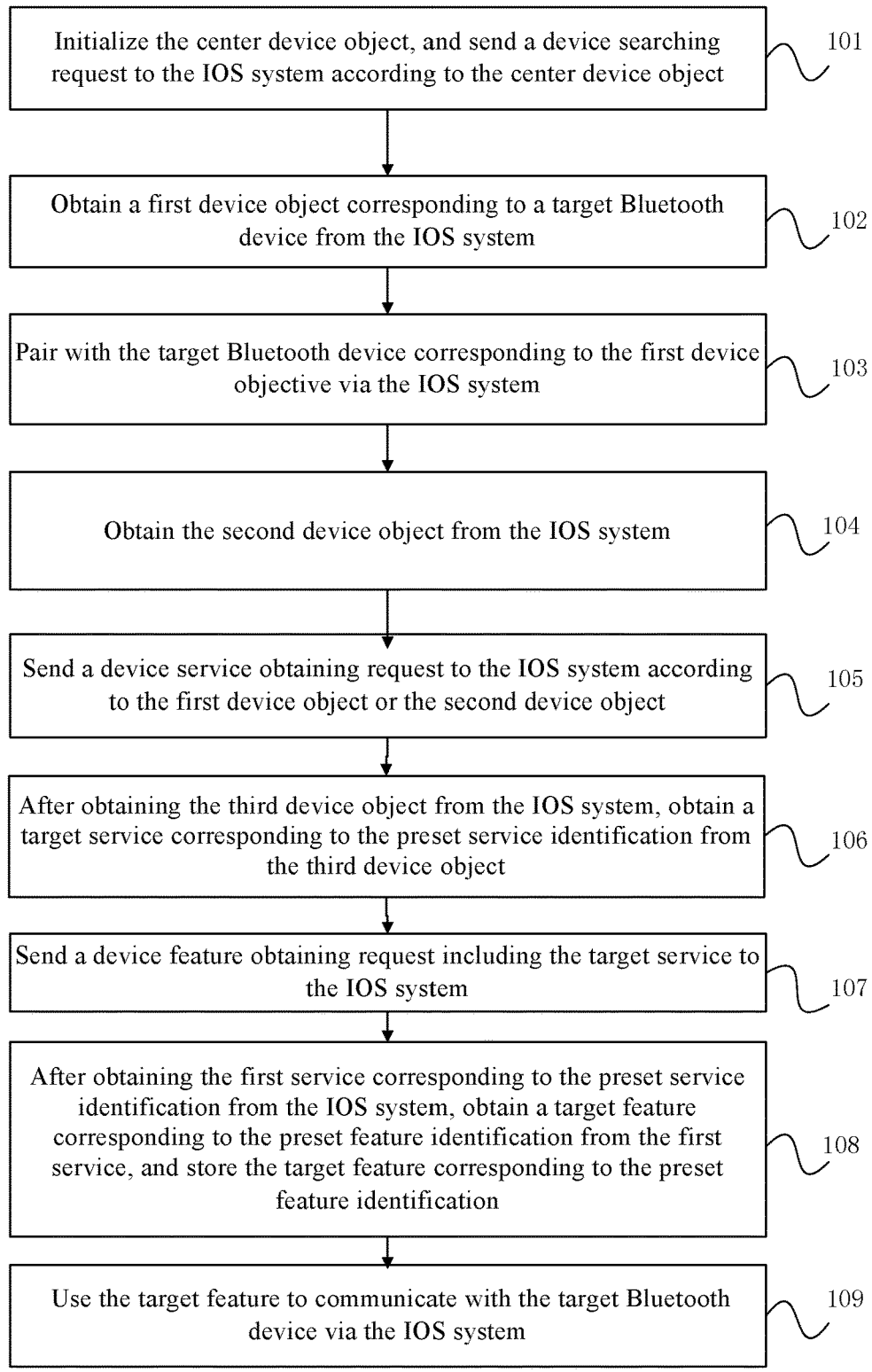
FIG. 1 is a flowchart of a method of Bluetooth communication provided by Embodiment 1 of the present disclosure.

This Embodiment 1 provides a method of Bluetooth communication: initializing a center device object, obtaining a first device object according to the center device object, pairing with a corresponding Bluetooth device according to the first device object, obtaining a second device object; obtaining a third device object according to the first device object and the second device object, obtaining a target service corresponding to a preset service identification from the third device object; obtaining a first service according to the target service, obtaining a target feature corresponding to a preset feature identification from the first service, storing the target feature, and using the target feature to communicate with the target Bluetooth device. FIG. 1 is a flowchart of a method of Bluetooth communication provided by Embodiment 1. As shown by FIG. 1, the method specifically includes the following.

The method of Bluetooth communication provided by the present embodiment can be implemented by, but not limited to, a driver installed on a mobile terminal with an IOS system, or an installed executable file which includes a driver and an application and is installed on a mobile terminal with an IOS system. The mobile terminal with IOS system can be a device such as an iphone, iPod itouch, iPad or Apple TV. In the present embodiment, the Bluetooth device is specifically a Bluetooth 4.0 device supporting Bluetooth Core Specification Version 4.0, for example, Bluetooth card reader supporting Bluetooth Core Specification Version 4.0, a Bluetooth KEY, etc.

Step 101: initializing the center device object, and sending a device searching request to the IOS system according to the center device object.

Specifically, initialize the center device object, and use the center device object to call a peripheral device discovering method of IOS system to send the device searching request to the IOS system.

In the present embodiment, the initializing the center device object is specifically: creating the center device object, and setting a center delegate interface in the IOS system according to the center device object.

The creating the center device object can be:
CBCentralManager *manager
manager=[[CBCentralManager alloc] init];
The setting the center delegate interface in the IOS system according to the center device object can be:
(instanceType)initWithDelegate:
(id<CBCentralManagerDelegate>)delegate queue:(dispatch_queue_t)queue;
In the present embodiment, the peripheral device discovering method can be:
@interface CBCentralManager: NSObject
(void)scanForPeripheralsWithServices:
(NSArray*)serviceUUIDs options:
(NSDictionary *)options;
@end
In the present embodiment, the parameter service UUIDs can be set to null or a preset service identification. When the parameter service UUIDs is set to be the preset service identification, the device searching request will specifically be a device searching request including the preset service identification.

In the present embodiment, the number of the Bluetooth device can be 1 or more than 1. For example, when the number of the Bluetooth device is 3, for example, Bluetooth 1, Bluetooth 2 and Bluetooth 3, the peripheral devices corresponding to Bluetooth devices obtained by the searching are respectively: peripheral device object 1 corresponding to the Bluetooth device 1, peripheral device object 2 corresponding to the Bluetooth device 2, and peripheral device object 3 corresponding to the Bluetooth device 3.

Step 102: obtaining a first device object corresponding to a target Bluetooth device of the IOS system.

Specifically, after the first device object corresponding to the target Bluetooth device of the IOS system is obtained via a first delegate interface, execute Step 103.

In the present embodiment, the first delegate interface can be a peripheral device discovering delegate interface of the IOS system:
@protocol CBCentralManagerDelegate<NSObject>
@optional
(void)centralManager:
(CBCentralManager*)centraldidDiscoverPeripheral:
(CBPeripheral*)peripheraladvertisementData:
(NSDictionary*)advertisementData RSSI:(NSNumber *) RSSI;
@end
The present step specifically includes:

Step a1: after the peripheral device objects which correspond to each Bluetooth device respectively are found by the searching, storing the peripheral device objects, and outputting the device identifications in the peripheral device objects.

Specifically, after obtaining the system center device object from the IOS system and the peripheral devices corresponding to each Bluetooth device via the first delegate interface, determine whether the system center device object matches the center device object, if yes, store the obtained peripheral device object into a device list and output the device identification in the peripheral device object.

In the present embodiment, the device identification is unique identification information of the Bluetooth device. Specifically, the device identification can specifically be a device name of the Bluetooth device, a MAC address, etc.

Step a2: after obtaining a selected target device identification, obtain the first device object corresponding to the target device identification.

Specifically, after obtaining the target device identification selected by a user, search in the first device list according to the target device identification to see whether a peripheral device object corresponding to the target device identification exists and, if found, take the peripheral device object corresponding to the target device identification as a first device object, execute Step 103; otherwise, report error.

Step 103: pairing with the target Bluetooth device corresponding to the first device objective via the IOS system.

Specifically, call a peripheral device connecting method of the IOS system by using the center device object to pair with the target Bluetooth device corresponding to the first device object.

In the present embodiment, the peripheral device connecting method of the IOS system can be:

@interface CBCentralManager: NSObject
(void)connectPeripheral:(CBPeripheral*)peripheral options:(NSDictonary*)options;
@end Step 104: obtaining the second device object from the IOS system.

Specifically, after obtaining the system center device object from the IOS system and the second device object via a second delegate interface, determine whether the system center device object and the center device object match and, if yes, store the second device object, set the peripheral delegate interface of the IOS system according to the second device object, and execute Step 105; otherwise, report error.

In the present embodiment, the second delegate interface can be a peripheral device connecting delegate interface of the IOS system:

@protocol CBCentralManagerDelegate <NSObject>
@optional
(void)centralManager:(CBCentralManager*)cental didConnectPeripheral:(CBPeripheral *)aPeripheral;
@end It should be noted that, before Step 104, the method can further include storing the first device object. Correspondingly, in Step 104, after obtaining the system center device object from the IOS system and the second device object, a peripheral delegate interface can be set in the IOS system according to the first device object.

Step 105: sending a device service obtaining request to the IOS system according to the first device object or the second device object.

Specifically, use the first device object or the second device object to call the peripheral device service discovering method of the IOS system to send the device service obtaining request to the IOS system.

In the present embodiment, the peripheral device service discovering method of the IOS system is:

@interface CBPeripheral: CBPeer
(void)discoverServices: (NSArray*) serviceUUIDs;
@end In the present embodiment, the device service obtaining request can includes a preset service identification. Specifically, the parameter serviceUUIDs is set to be the preset service identification.

Step 106: after obtaining the third device object from the IOS system, obtaining a target service corresponding to the preset service identification from the third device object.

Specifically, after obtaining the third device object corresponding to the target Bluetooth device from the IOS system via a third delegate interface, determining whether a target service corresponding to the preset service identification exists in the third device object and, if yes, execute Step 107; otherwise, report error.

In the present embodiment, the third delegate interface can be a peripheral device service discovering delegate interface of the IOS system:

@protocol CBPeripheralDelegate<NSObject>
@optional
(void)peripheral:(CBPeripheral*)peripheral didDiscoverServices:(NSError *)error;
@end Step 107: sending a device feature obtaining request including the target service to the IOS system.

Specifically, use the first device object or the second device object or the third device object to call a peripheral device feature discovering method of the IOS system to send the device feature obtaining request including the target service to the IOS system.

The peripheral device feature discovering method of the IOS system can be: @interface CBPeripheral: CBPeer
(void)discoverCharacteristics:(NSArray*)characteristicUUIDs forService:(CBService *)service;
@end In the present embodiment, the device feature obtaining request can further include a preset feature identification.

Step 108: after obtaining the first service corresponding to the preset service identification of the IOS system, obtaining target feature corresponding to the preset feature identification from the first service, and storing the target feature corresponding to the preset feature identification.

Specifically, after obtaining the first service from the IOS system via the fourth delegate interface, determine whether the first service matches the preset service identification and, if yes, obtain the target feature corresponding to the preset feature identification from the first service, and store the target feature corresponding to the preset feature identification; otherwise, report error.

In the present embodiment, the fourth delegate interface can be a peripheral device feature discovering delegate interface:

@protocol CBPeripheralDelegate<NSObject>
@optional
(void)peripheral:(CBPeripheral*)peripheral didDiscoverCharacteristicForService:(CBService*)service error:(NSError *)error;
@end The preset feature identification in the present embodiment can specifically includes a preset reading feature identification and a preset writing feature identification. Correspondingly, the present step can specifically include: after obtaining the first service corresponding to the preset service identification from the IOS system, obtaining the target reading feature corresponding to the preset reading feature identification and the target writing feature corresponding to the preset writing feature identification from the first service, and storing the target writing feature and the target reading feature.

Step 109: using the target feature to communicate with the target Bluetooth device via the IOS system.

Specifically, use the target reading feature and the target writing feature to communicate with the target Bluetooth device via the IOS system.

It should be noted that, before using the target reading feature and the target writing feature to communicate with the target Bluetooth device via the IOS system, the method can further include: opening a reading channel identification of the target reading feature. The opening the reading channel identification of the target reading feature can specifically include: setting the reading channel identification to be 1.

In the present embodiment, Step 102 can specifically include:

after obtaining the peripheral device objects corresponding to each Bluetooth device of the IOS system, storing the peripheral device object, and taking the first peripheral device object in the stored peripheral device objects as the first device object.

Correspondingly, Step 106 can specifically include: after obtaining the third device object corresponding to the target Bluetooth device from the IOS system via the third delegate interface, determining whether a target service corresponding to the preset service identification exists in the third device object and, if yes, executing Step 107; otherwise, taking a next peripheral device object after the first device object as the first device object, and go back to Step 103.

In the present embodiment, after obtaining the second device object from the IOS system in Step 104, the step can further include:

Step b1: storing the second device object as a paired device object.

Specifically, take the second device object as a paired device object and store the paired device object into a second device list.

It should be noted that, before Step 104, the method can further include: storing the first device object. After obtaining the second device object from the IOS system in Step 105, the method can further include: storing the first device object as a paired device object.

Correspondingly, before sending the device searching request to the IOS system according to the center device object in Step 101, the method can further includes:

Step c1: determining whether a paired device object exists and, if yes, disconnecting the pairing with the Bluetooth device corresponding to the paired device object; after disconnecting the pairing with the Bluetooth device corresponding to the paired device object, clearing the paired device object, continuing to send the device searching request to the IOS system according to the center device object; otherwise, sending the device searching request to the IOS system according to the center device object directly.

Specifically, determine whether any paired device object exists in the second device list.

If a paired device object exists in the second device list, call a peripheral device disconnecting method of the IOS system to disconnect the pairing with the Bluetooth device corresponding to the paired device object. After obtaining the disconnected peripheral device object from the IOS system via a fifth delegate interface of the IOS system, determine whether the disconnected peripheral device object matches any paired device object. After determining the disconnected peripheral device object and the paired device object matches, clear the paired device object from the second device list, continue to send the device searching request to the IOS system according to the center device object. After determining that the disconnected peripheral device object and the paired device object do not match, report error;

If the paired device object does not exist in the second device list, send a device searching request to the IOS system according to the center device directly.

In the present embodiment, the peripheral device disconnecting method of the IOS system is:

@interface CBCentralManager: NSObject
(void)disconnectPeripheral:(CBPeripheral*)peripheral
@end The fifth delegate interface can be a peripheral device disconnecting delegate interface:

@interface CBCentralManager: NSObject
(void)centralManager:(CBCentralManager*)central didDisconnectPeripheral:(CBPeripheral*)aPeripheral error:(NSError *)error
@end After taking the first device object or the second device object as the paired device object and storing the paired device object and before Step 103, the method can further include:

determining whether any paired device object exists and, if a paired device object exists, determining whether the first device object and the paired device object matches and; if yes, using the stored target feature to communicate with the target Bluetooth device via the IOS system or; if no, pairing the target Bluetooth device corresponding to the first device object via the IOS system, and continuing the procedure; if the paired device object does not exist, pairing with the target Bluetooth device corresponding to the first device object via the IOS system, on continuing the procedure.

It should be noted that, all of the first device object, the second device object and the third device object correspond to the target Bluetooth devices. The first device object, the second device object and the third device object can be the same or different, the first service and the target service can be the same or different. The center delegate interface can include: the third delegate interface, the fourth delegate interface and a sixth delegate interface.

The present embodiment provides a method of Bluetooth communication, by which a mobile terminal is set as the center device by initializing the center device object, and the first device object, the second device object and the third device object corresponding to the target Bluetooth device are obtained via the IOS system. The target feature corresponding to the preset feature identification is obtained according to the third device object. Communication between the mobile terminal with the IOS system and the target Bluetooth device is implemented via the target feature.

Embodiment 2

The present disclosure provides a method of Bluetooth communication, which is adapted to a system including a mobile terminal and a target Bluetooth device. In this case, the mobile terminal is installed with an application, a driver and an IOS system. The mobile terminal can specifically be a device such as an iphone, iPod, itouch, iPad or Apple TV, etc. The Bluetooth device specifically supports Bluetooth card reader supporting Bluetooth Core Specification Version 4.0 or Bluetooth KEY, etc.

Figure 2:
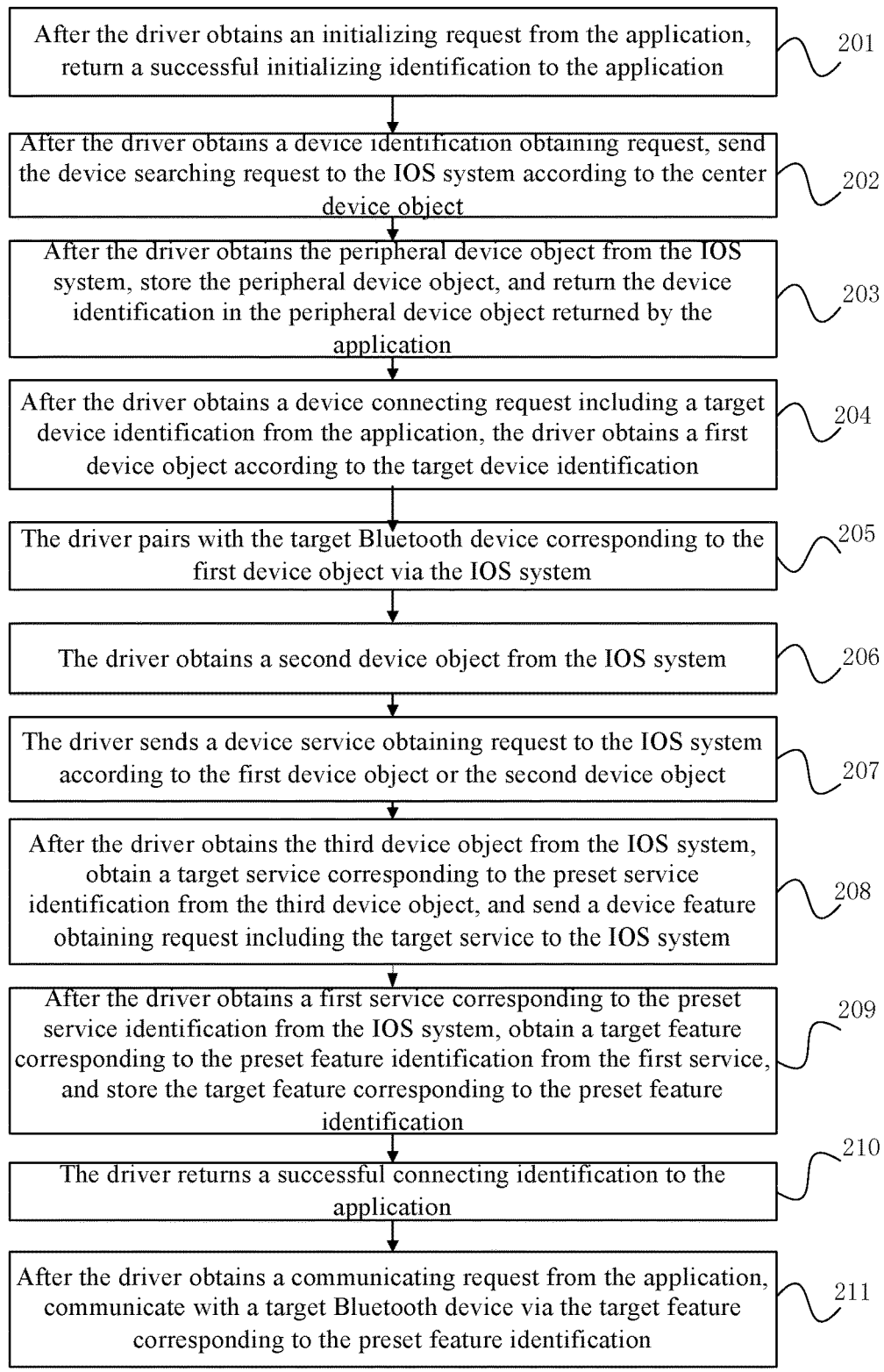
FIG. 2 is a flowchart of a method of Bluetooth communication provided by Embodiment 2 of the present disclosure.

FIG. 2 is a flowchart of the method of Bluetooth communication method provided by Embodiment 2. As shown by FIG. 2, the method specifically includes:

Step 201: after the driver obtains an initializing request from the application, returning a successful initializing identification to the application.

Specifically, after the driver obtains the initializing request from the IOS system via a first drive interface, initialize a center device object, set and store the successful initializing identification, and return the successful initializing identification to the application.

In the present embodiment, before sending a device searching request to the IOS system according to the center device object in Step 202, the method further includes initializing the center device object by the driver.

In the present embodiment, the initializinges the center device object by the driver specifically includes that the driver creates the center device object, and sets a center delegate interface in the IOS system according to the center device object.

The creating the center device object can be:
CBCentralManager *manager
manager=[[CBCentralManager alloc] init];

The setting the center delegate interface in the IOS system according to the center device can be:
(instanceType)initWithDelegate:
(id<CBCentralManagerDelegate>)delegate queue:(dispatch_queue_t)queue;

Step 202: after the driver obtains a device identification obtaining request, sending the device searching request to the IOS system according to the center device object;

Specifically, after the driver obtains the device identification obtaining request from the application via a second drive interface, use the center device object to call a peripheral device discovering method of the IOS system to search for a peripheral object corresponding to the Bluetooth device.

In the present embodiment, the peripheral device discovering method can be:
@interface CBCentralManager: NSObject
(void)scanForPeripheralsWithServices:
(NSArray*)serviceUUIDs options:
(NSDictionary *)options;
@end In the present embodiment, the device identification obtaining request can include the successful initializing identification. When the device identification obtaining request includes the successful initializing identification, this step will, in response, be specifically that: after the driver obtains the device identification obtaining request including the successful initializing identification from the application, send the device searching request to the IOS system according to the center device.

In the present embodiment, the number of the Bluetooth device can be 1 or more than 1. For example, when the number of the Bluetooth device is 3, for example, Bluetooth 1, Bluetooth 2 and Bluetooth 3, the peripheral devices corresponding to Bluetooth devices obtained by the searching are respectively: peripheral device object 1 corresponding to the Bluetooth device 1, peripheral device object 2 corresponding to the Bluetooth device 2 and peripheral device object 3 corresponding to the Bluetooth device 3.

Step 203: after the driver obtains the peripheral device object from the IOS system, store the peripheral device object and return the device identification in the peripheral device object to the application.

Specifically, after the driver obtains the center device object and the peripheral device object in the IOS system via the first delegate interface, the driver determines whether a system center device object matches the center device object and, if yes, stores the obtained peripheral device object into the first device list, and returns the device identification in the peripheral device object to the application.

In the present embodiment, the first delegate interface can be a peripheral device discovering delegate interface:
@protocol CBCentralManagerDelegate <NSObject>
@optional
(void)centralManager:
(CBCentralManager*)centraldidDiscoverPeripheral:
(CBPeripheral*)peripheraladvertisementData:
(NSDictionary*)advertisementData RSSI:(NSNumber*) RSSI;
@end In the present embodiment, the device identification is unique identification information of the Bluetooth device. In the present embodiment, the device identification can be the device name of the Bluetooth device.

It should be noted that the device identification in the peripheral device is output after the application receives the device identification in the peripheral device of the driver.

Step 204: after the driver obtains a device connecting request including a target device identification from the application, the driver obtains a first device object according to the target device identification.

When the driver obtains the target device identification from the application via a third drive interface, the driver searches in the first device list according to the target device identification to see whether a peripheral device object, which corresponds to the target device identification, exists and, if found, take the peripheral device object corresponding to the target device identification as the first device object and execute Step 205; otherwise, return error information to the application via the third drive interface.

It should be noted that, after the driver obtains the target device identification selected by the user from a display interface, send the device connecting request including the target device identification to the driver. After the application obtains error information from the driver, output the error information.

In the present embodiment, the device connecting request can include the successful initializing identification. Correspondingly, the present step specifically includes that when the driver obtains the device connecting request including the successful initializing identification and the target device identification from the application, the driver obtains the first device object according to the target device identification.

Step 205: the driver pairs with the target Bluetooth device corresponding to the first device object via the IOS system.

Specifically, the driver uses the center device object to call a peripheral device connecting method of the IOS system to pair with the target Bluetooth device corresponding to the first device object.

In the present embodiment, the peripheral device connecting method of the IOS system can be:
@interface CBCentralManager: NSObject
(void)connectPeripheral:(CBPeripheral*)peripheral options:(NSDictonary*)options;
@end Step 206: the driver obtains a second device object from the IOS system;

Specifically, after the driver obtains the second device object from the IOS system via the second delegate interface, set a peripheral delegate interface of the IOS system according to the first device object and the second device object, and execute Step 207. After the driver obtains error information from the IOS system via the second delegate interface, return error information to the application.

In the present embedment, the second delegate interface can be a peripheral device connecting delegate interface of the IOS system:
@protocol CBCentralManagerDelegate<NSObject>
@optional
(void)centralManager:(CBCentralManager*)cental didConnectPeripheral:(CBPeripheral *)aPeripheral;
@end It should be noted that, after the application obtains error information from the driver, output error information.

Step 207: the driver sends a device service obtaining request to the IOS system according to the first device object or the second device object.

The driver uses the first device object or the second device object to call a peripheral device service discovering method of the IOS system to send the device service obtaining request to the IOS system;

The peripheral device service discovering method of the IOS system can be:
@interface CBPeripheral: CBPeer
(void)discoverServices:(NSArray*)serviceUUIDs;
@end The device service obtaining request can further include a preset service identification.

Step 208: after the driver obtains the third device object from the IOS system, obtain target service corresponding to the preset service identification from the third device object, and send a device feature obtaining request including the target service to the IOS system.

Specifically, after the driver obtains the third device object from the IOS system via the third delegate interface, determine whether the target service corresponding to the preset service identification exists in the third device object and, if yes, send the device feature obtaining request including the target service to the IOS system; otherwise, return error information to the application.

In Step 208, that the driver sends the device feature obtaining request to the IOS system is specifically that: the driver uses the first device object or the second device object or the third device object to call a peripheral device feature discovering method of the IOS system to send the device feature obtaining request including the target service to the IOS system. In the present embodiment, the third delegate interface can be the peripheral device service discovering delegate interface of the IOS system:
@protocol CBPeripheralDelegate<NSObject>
@optional
(void)peripheral:(CBPeripheral*)peripheral didDiscoverServices:(NSError *)error;
@end The peripheral device feature discovering method of the IOS system can be: @interface CBPeripheral: CBPeer
(void)discoverCharacteristics:(NSArray*)characteristicUUIDs forService:(CBService *)service;
@end The device feature obtaining request can further include a preset feature identification.

Step 209: after the driver obtains a first service corresponding to the preset service identification of the IOS system, obtaining target feature corresponding to the preset feature identification from the first service, and storing the target feature corresponding to the preset feature identification.

Specifically, after the driver obtains a fourth device object and the first service from the IOS system via a fourth delegate interface, determine whether the fourth device object matches the second device object and the first service matches the preset service identification and, if yes, obtain the target feature corresponding to the preset feature identification in the first service, and store the target feature corresponding to the preset feature identification; otherwise, return error information to the application.

When the preset feature identification specifically includes a preset reading feature identification and a preset writing feature identification, this step specifically includes:
after the driver obtains the first service corresponding to the preset service identification of the IOS system, obtaining the target read feature corresponding to the preset reading feature identification and the target writing feature corresponding to the preset writing feature identification from the first service, and storing the target reading feature and the target writing feature.

In the present embodiment, the fourth delegate interface can be a peripheral device feature discovering delegate interface:
@protocol CBPeripheralDelegate<NSObject>
@optional
(void)peripheral:(CBPeripheral*)peripheral didDiscoverCharacteristicForService:(CBService*)service error:(NSError *)error;
@end Step 210: the driver returns a successful connecting identification to the application.

Specifically, the driver sets and stores the successful connecting identification, and returns the successful connecting identification to the application.

Step 211: after the driver obtains a communicating request from the application, communicate with a target Bluetooth device via the target feature corresponding to the preset feature identification.

Specifically, after the driver obtains the communicating request including a communication instruction from the application via the fourth drive interface, the driver sends the communication instruction to the target Bluetooth device via the writing feature corresponding to the preset writing feature identification. After the sixth delegate interface receives a communication instruction response by using the target reading feature corresponding to the preset reading feature identification via a sixth delegate interface, send the communication instruction response to the application via the fourth drive interface.

The sixth delegate interface can be a peripheral service feature value updating delegate interface of the IOS system:
@protocol CBPeripheralDelegate<NSObject>
@optional
(void)peripheral:(CBPeripheral*)aPeripheral didUpdateValueForCharacteristic:(CBCharacteristic*)characteristic error:(NSError *)error
@end It should be noted that, before the driver receives the communication instruction response from the target Bluetooth device via the target reading feature, the driver further includes: opening a reading channel identification of the target reading feature. The opening the reading channel identification of the target reading feature can specifically includes that the driver sets the reading channel identification to be 1.

In the present embodiment, the communicating request can further include a successful connecting identification. Correspondingly, the present step specifically includes that: when the driver obtains the communicating request including the successful connecting identification from the application, communicate with the target Bluetooth device via the target feature.

It should be noted that, in the present embodiment, the successful initializing identification and the successful connecting identification can be the same or different.

In the present embodiment, in Step 206, after the driver obtains the second device object from the IOS system, the step further includes:

Step c1, the driver takes the second device object as the paired device object and stores the paired object.

Specifically, the driver stores the second device object as a paired device object in the second device list.

It should be noted that, before Step 206, the method further includes that the driver stores the first device object. Correspondingly, in Step 206, after the driver obtains the system center device object and the second device object from the IOS system, the step further includes that the driver stores the first device object as a paired device object.

After the drive device stores the first device object or the second device object as the paired device object, before the driver searches the peripheral device object in Step 202, the step further includes:

Step d1, the driver determines whether the paired device object exists and, if yes, disconnect pairing with the Bluetooth device corresponding to the paired device object, clear the paired device object; and after the drive device clears the connected device object, search for a peripheral device object and continue the procedure; otherwise, search for a peripheral device object directly, and continue the procedure.

Specifically, the driver determines whether any paired device object exists in the second device list.

If a paired device object exists in the second device list, call a peripheral device disconnecting method of the IOS system to disconnect the pairing with the Bluetooth device corresponding to the paired device object. After the driver obtains the disconnected device object from the IOS system via a fifth delegate interface of the IOS system, the driver determines whether the disconnected device object matches the paired device object and, if yes, clear the paired device object in the second device list, continue obtaining the peripheral device object. When the driver determines that the disconnected device object and the paired device object do not match, return error information to the application;

If the paired device object does not exist in the second device list, obtain the peripheral device object directly.

In the present embodiment, the fifth delegate interface can be a peripheral device disconnecting delegate interface:

@interface CBCentralManager: NSObject
(void)centralManager:(CBCentralManager*)central didDisconnectPeripheral:(CBPeripheral*)aPeripheral error:(NSError *)error
@end When the driver takes the first device object and the second device object as the paired device object, then before the driver obtains the first device object according to the target device identification, the step further includes:

the driver determines whether the target device identification matches the paired device object and, if yes, execute Step 210; otherwise, obtain the first device object according the target device identification, and continue the procedure.

Specifically, the driver determines whether the target device identification matches the device identification of the paired device object in the second device list and, if yes, execute Step 210; otherwise, obtain the first device object according to the target device identification, and continue the procedure.

It should be noted that, after Step 201, the method can further include:

when the driver obtains a device releasing request from the application, clear the stored target feature and return a first successful releasing identification to the application.

Specifically, after the driver obtains the device releasing request from the application via the fifth drive interface, clear the stored target feature and return the first successful releasing identification to the application via a fifth drive interface.

In the present embodiment, after Step 201, the driver can execute Step f1.

Step f1: after the driver obtains the device connecting request from the application, send the device searching request to the IOS system according to the center device, obtain the first device object from the IOS system, and execute Step 205.

Step f1 can specifically include:

after the driver obtains the device connecting request from the application via a sixth drive interface, send the device searching request to the IOS system according to the center device, obtain the peripheral device object from the IOS system, store the peripheral device object, and take the first peripheral device object in the stored peripheral device objects as the first device object. Correspondingly, the device searching request may or may not include the preset service identification.

If the device searching request does not include the preset service identification, Step 208 specifically includes: after the driver obtains a third device object from the IOS system, obtain the target service corresponding to the preset service identification from the third device object, determine whether the target service corresponding to the preset service identification exists in the third device object and, if yes, send the device feature obtaining request including the target service to the IOS system; otherwise, take a next peripheral device of the first device object as the first device object, and go back to Step 205. Further, if the first device object is the last peripheral device object, send error information to the application via the sixth drive interface if the determination made in Step 208 is no.

In the present embodiment, the first drive interface, the second drive interface, the third drive interface, the fourth drive interface, the fifth drive interface and the sixth drive interface are not named after any particular order of time or logic. The center delegate interface includes: the first delegate interface, the second delegate interface and the fifth delegate interface. The peripheral delegate interface includes the third delegate interface, the fourth delegate interface and the sixth delegate interface.

The present embodiment provides a method of Bluetooth communication, which is adapted to the system including a mobile terminal and a target Bluetooth device. In this case, the mobile terminal is installed with the application, the driver and the IOS system. After the driver obtains a request from the application, the mobile terminal is set as the center device by initializing the center device object. The first device object corresponding to the target Bluetooth device is obtained via the IOS system; the corresponding target Bluetooth device is paired with according to the first device object, the second device object is obtained; the third device object is obtained according to the first device object and the second device object; the target service corresponding to the preset service identification is obtained from the third device object; the first service is obtained according to the target service, the target feature corresponding to the preset feature identification is obtained from the first service, the communication between the mobile terminal with IOS system and the target Bluetooth device is realized by the target feature. It should be noted that the driver can execute corresponding operation to realize the present disclosure after obtaining the request from the application via (one or more of) the drive interfaces.

Embodiment 3

The present embodiment provides a method of Bluetooth communication which is adapted to a system, including a mobile terminal and a target Bluetooth device. In this case, the mobile terminal is installed with an application, a driver and IOS system. In the present embodiment, the driver is specifically a PC/SC driver library. The mobile terminal can specifically be a device, such as an iphone, iPod, itouch, iPad or Apple TV, etc. The Bluetooth device is specifically a Bluetooth card reader supporting Bluetooth Core Specification Version 4.0.

Figure 3:
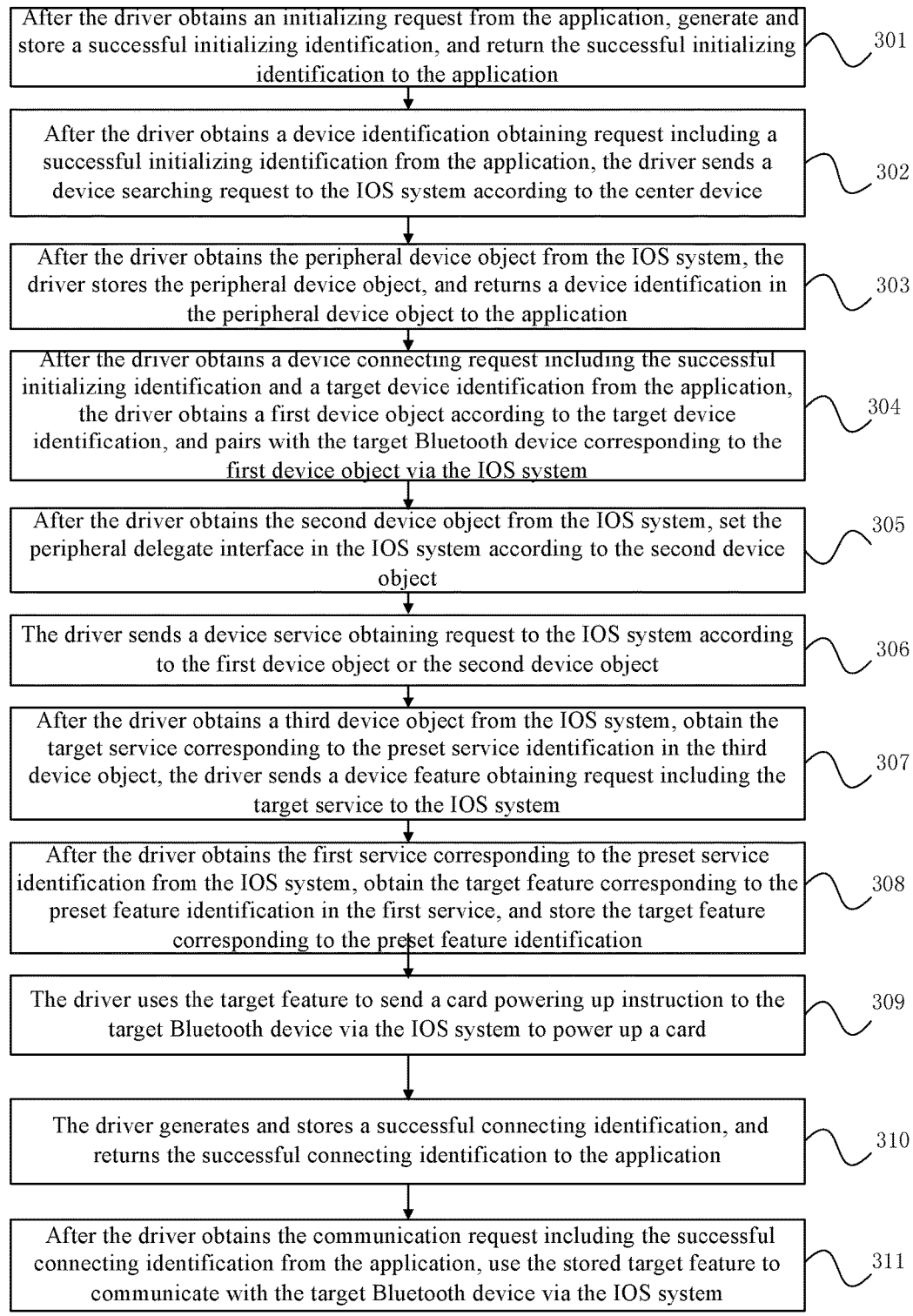
FIG. 3 is a flowchart of a method of Bluetooth communication provided by Embodiment 3 of the present disclosure.

FIG. 3 is a flowchart of the method of Bluetooth communication provided by Embodiment 3 of the present disclosure. As shown in FIG. 3, the method specifically includes:

Step 301: after the driver obtains an initializing request from the application, generating and storing a successful initializing identification, and returning the successful initializing identification to the application.

Specifically, after the driver obtains the initializing request from the application via a resource manager context establishing interface, generate a resource manager context handle, take the resource manager context handle as a successful initializing identification, store the successful initializing identification, return the successful initializing identification to the application via the resource manager context establishing interface.

In the present embodiment, the resource manager context establishing interface is:

SCardEstablishContext(unsigned long dwScope,
const void *pvReserved1, const void *pvReserved2, long *phContext), where the parameter phContext is the successful initializing identification.

Step 302: after the driver obtains a device identification obtaining request including a successful initializing identification from the application, the driver sends a device searching request to the IOS system according to the center device.

In the present embodiment, in Step 302, before the driver sends the device searching request to the IOS system according to the center device object, the step further includes that the driver initializes the center device object.

In the present embodiment, that the driver initializes the center device object specifically includes that: the driver creates and stores the center device object, and sets a center delegate interface in the IOS system according to the center device object.

Step 302 specifically includes:

Step 3021: after the driver obtains a first input information from the application by enumerating card reader interface, determining whether the first input information matches the stored successful initializing identification and, if yes, execute Step 3022; otherwise, return error information to the application via the enumerating card reader device interface;

Step 3022: the driver uses the center device object to call a peripheral device discovering method of the IOS system to search for the peripheral device object.

In the present embodiment, the peripheral device discovering method can be:

@interface CBCentralManager: NSObject
(void)scanForPeripheralsWithServices:
(NSArray*)serviceUUIDs options:
(NSDictionary *)options;
@end where the parameter serviceUUIDs can be null or a preset service identification. Preferably, the parameter serviceUUIDs in the present step is null.

In Step 3022, when the serviceUUIDs is the preset service identification, Step 3022 is specifically that: the driver uses the center device object to call the peripheral device discovering method of the IOS system to search for a peripheral device object matching the preset service identification.

Step 303: after the driver obtains the peripheral device object from the IOS system, the driver stores the peripheral device object, and returns a device identification in the peripheral device object to the application.

The present step specifically includes:

Step 3031: after the driver obtains the system center device object from the IOS system and the peripheral device object via a peripheral device discovering delegate interface of the IOS system, determining whether the system center device object matches the center device object and, if yes, execute Step 3032; otherwise, returning error information to the application via the enumerating card reader device interface;

Step 3032: the driver stores the peripheral device object in a first device list, returns the device identification in the peripheral device object to the application via the enumerating card reader device interface, and executes Step 304.

It should be noted that, after the application receives the device identification of the peripheral device object of the driver via the enumerating card reader device interface, output the device identification of the peripheral device object. When the application receives the error information of the driver via the enumerating card reader device interface, output error information.

In the present embodiment, the enumerating card reader device interface is: SCardListReaders(long hContext, const char *mszGroups, char *mszReaders, unsigned long *pcchReaders), where the parameter hContext is the first input information, and the parameter mszReaders is the device identification.

In the present embodiment, the device identification is unique identification information. In the present embodiment, the unique identification information can be the device name of a Bluetooth device.

The peripheral device discovering delegate interface is:
@protocol CBCentralManagerDelegate<NSObject>
@optional
(void)centralManager:(CBCentralManager*)central
didDiscoverPeripheral:(CBPeripheral*)peripheral
advertisementData:(NSDictionary*)advertisementData
RSSI:(NSNumber *)RSSI;
@end In this case, the parameter central is the system center device object, and the parameter peripheral is the peripheral device object.

Step 304: after the driver obtains a device connecting request including the successful initializing identification and a target device identification from the application, the driver obtains a first device object according to the target device identification, and pairs with the target Bluetooth device corresponding to the first device object via the IOS system.

The step specifically includes:

Step 3041: after the driver obtains second input information and the target device identification from the application via a card reader connecting interface, the driver determines whether the second input information matches the successful initializing identification and, if yes, executes Step 3042; otherwise, executes Step 3044;

Step 3042: the driver searches for whether a peripheral device object corresponding to the target device identification exists in the first device list according to the target device identification and, if yes, executes Step 3043; otherwise, executes Step 3044.

Step 3043: the driver takes the peripheral device object corresponding to the target device identification as a first device object, calls a peripheral device connecting method of the IOS system to pair with the target Bluetooth device corresponding to the first device object, and executes Step 305.

Specifically, the driver takes the peripheral device object corresponding to the target device identification as the first device object, uses the center device object to call the peripheral device connecting method of the IOS system to pair with the target Bluetooth device corresponding to the first device object.

In the present embodiment, the peripheral device connecting method of the IOS system is:
@interface CBCentralManager: NSObject
(void)connectPeripheral:(CBPeripheral*)peripheral options:(NSDictonary*)options;
@end
where the parameter peripheral is the first device object.

Step 3044: the driver returns error information to the application via the card reader connecting interface.

In the present embodiment, the card reader connecting interface is: long SCardConnect(long hContext, const char *szReader, unsigned long dwShareMode, unsigned long dwPreferredProtocols,long *phCard, unsigned long *pdwActiveProtocol); where the parameter szReader is the target device identification, and the parameter phCard is the second input information.

It should be noted that, after the application receives error information of the driver via the card reader connecting interface, output error information.

Step 305: after the driver obtains the second device object from the IOS system, setting the peripheral delegate interface in the IOS system according to the second device object.

Step 303 specifically includes:

Step 3051: after the driver obtains the system center device object from the IOS system and the second device object from the IOS system via the peripheral device connecting delegate interface of the IOS system, determining whether the system center device object matches the center device object and, if yes, executing Step 3052; otherwise, executing Step 3053.

Step 3052: the driver stores the second device object, sets a delegate interface of the second device object in the IOS system, and executes Step 306.

Step 3053: the driver returns error information to the application via the card reader connecting interface.

It should be noted that, before Step 305, the method further includes that: the driver stores the first device object; correspondingly, after the driver obtains the system center device object and the second device object from the IOS system in Step 305, the peripheral delegate interface in the IOS system can be set according to the first device object.

Before Step 3052, the method further includes: determining whether the second device object matches the first device object and; if yes, executing Step 3052; otherwise, executing Step 3053.

Step 306: the driver sends a device service obtaining request to the IOS system according to the first device object or the second device object.

Specifically, the driver uses the first device object or the second device object to call the peripheral device service discovering method of the IOS system to obtain the target service.

The peripheral device service discovering method of the IOS system can be:
@interface CBPeripheral: CBPeer
(void)discoverServices:(NSArray*)serviceUUIDs;
@end
where the parameter serviceUUIDs can be null or a preset service identification.

When the parameter serviceUUIDs is the preset service identification, the present step specifically includes: the driver calls the peripheral device service discovering method of the IOS system to obtain a target service corresponding to the preset service identification.

Step 307: after the driver obtains a third device object from the IOS system, obtaining the target service corresponding to the preset service identification in the third device object, and the driver sends a device feature obtaining request including the target service to the IOS system.

Step 307 specifically includes:

Step 3071: after the driver obtains the third device object from the IOS system via the peripheral device service discovering delegate interface, determining whether the target service corresponding to the preset service identification exists in the third device object and, if yes, execute Step 3072; otherwise, return error information to the application via the card reader connecting interface.

Step 3072: the driver uses the first device object or the second device object or the third device object to call a peripheral device feature discovering method of the IOS system to send the device feature obtaining request including the target service to the IOS system.

The peripheral device feature discovering method of the IOS system can be:
@interface CBPeripheral: CBPeer
(void)discoverCharacteristics:(NSArray*)characteristicUUIDs forService:(CBService *)service;
@end
where the parameter service is the target service. The parameter characteristicUUIDs can be null or a preset feature identification.

Step 308: after the driver obtains the first service corresponding to the preset service identification of the IOS system, obtaining the target feature corresponding to the preset feature identification in the first service, and storing the target feature corresponding to the preset feature identification.

Specifically, after the driver obtains a fourth device object and the first service from the IOS via the peripheral device feature discovering delegate interface, determine whether the fourth device object matches the second device object and determine whether the first service matches the preset service identification and, if yes, obtain the target feature corresponding to the preset feature identification from the first service, and obtain the target feature corresponding to the preset feature identification; otherwise, return error information to the application via the card reader connecting interface.

When the preset feature identification includes a preset reading feature identification and a preset writing feature identification, Step 308 specifically includes:

after the driver obtains the first service corresponding to the preset service identification from IOS system, obtaining target reading feature corresponding to the preset reading feature identification and target writing feature corresponding to the preset writing feature identification, and storing the target reading feature and the target writing feature.

After the driver obtains the fourth device object and the first service from the IOS system via the peripheral device feature discovering delegate interface, determine whether the fourth device object matches the second device object and determine whether the first service matches the preset service identification and, if yes, determine whether the target feature corresponding to the preset reading feature identification and the preset writing feature identification exists in the first service and, if yes, store the target reading feature corresponding to the preset reading feature identification; otherwise, return error information to the application via the card reader connecting interface.

The peripheral device feature discovering delegate interface of the IOS system can be:

@protocol CBPeripheralDelegate<NSObject>
@optional
(void)peripheral:(CBPeripheral*)peripheral didDiscoverCharacteristicForService:(CBService*)service error:(NSError *)error;
@end where the parameter service is the first service.

Step 309: the driver uses the target feature to send a card powering up instruction to the target Bluetooth device via the IOS system to power up a card.

Step 309 specifically includes:

Step 3091: the driver uses the target writing feature corresponding to the preset writing feature identification to send the power up instruction to the target Bluetooth device via the IOS system.

Specifically, the driver calls a writing method of the IOS system to send the power up instruction to the target Bluetooth device according to the target writing feature.

The writing method of the IOS system is:

@interface CBPeripheral: CBPeer
(void)writeValue: (NSData *) data forCharacteristic: (CBCharacteristic *) characteristic type: (CBCharacteristic WriteType) type;
@end where the parameter data is the power up instruction, and the parameter characteristic is the target writing feature corresponding to the preset writing feature identification.

Step 3092: after the driver obtains a card powering up response from the IOS system via the target reading feature corresponding to the preset reading feature identification, executing Step 310.

Specifically, after the driver obtains the target reading feature corresponding to the preset reading feature identification and a fifth device object via an peripheral service feature value updating delegate interface of the IOS system, determine whether the fifth device object matches the fifth device object and, if yes, obtain the card powering up response in the target reading feature corresponding to the preset reading feature identification, and execute Step 310; otherwise, return error information to the application via the card reader connecting interface.

The peripheral service feature value updating delegate interface is:

@protocol CBPeripheralDelegate<NSObject>
@optional
(void)peripheral:(CBPeripheral*)aPeripheral didUpdateValueForCharacteristic:(CBCharacteristic*)characteristic error:(NSError *)error
@end It should be noted that, before the driver obtains the card powering up response from the IOS system via the reading feature corresponding to the preset reading feature identification, the method further includes: opening a reading channel identification of the reading feature. The opening the reading channel identification of the reading feature can be specifically that the driver sets the reading channel identification to be 1.

Step 310: the driver generates and stores a successful connecting identification, and returns the successful connecting identification to the application.

Specifically, the driver generates a card handle, takes the card handle as the successful connecting identification and stores the successful connecting identification, and returns the successful connecting identification to the application via the card reader connecting interface.

In the present embodiment, the successful initializing identification and the successful connecting identification can be the same or different.

Step 311: after the driver obtains the communication request including the successful connecting identification from the application, using the stored target feature to communicate with the target Bluetooth device via the IOS system.

Specifically, after the driver obtains a third input information and the communication instruction from the application via a peripheral device accessing instruction interface, determining whether the third input information matches the successful connecting identification and, if yes, using the stored target communicate with the target device via the IOS system.

Step 311 specifically includes:

Step 3111: after the driver obtains the third input information and the communication instruction from the application via the peripheral device accessing instruction interface, determining whether the third input information and the successful connecting identification are matched and, if yes, using the second device object to call a writing method of the IOS system to send the communication instruction via the target writing feature;

Step 3112: after the driver obtains the target reading feature and the fifth device object via the peripheral service feature value updating delegate interface of the IOS system, determining whether the fifth device object matches the second device object and, if yes, executing Step 3113; otherwise, returning error information to the application via the peripheral device accessing instruction interface; and Step 3113: the driver obtains the communication instruction response in the target reading feature, and returns the communication instruction to the application via the peripheral device accessing instruction interface.

The peripheral device accessing instruction interface is:

LONG SCardTransmit(SCARDHANDLE hCard, LPCSCARD_IO_REQUEST pioSendPci, LPCBYTE pbSendBuffer, DWORD cbSendLength, LPSCARD_IO_REQUEST pioRecvPci, LPBYTE pbRecvBuffer, LPDWORD pcbRecvLength); where the parameter hCard is the third input information.

In the present embodiment, in Step 305 after the driver obtains the second device object via the IOS system, Step 305 can further include:

Step h1: the driver stores the second device object as a paired device object. Specifically, the driver stores the second device object as a paired device object in a second device list.

It should be noted that, before Step 305, the method further includes: the driver stores the first device object; correspondingly, in Step 305 after the driver obtains a system center device object and the second device object from the system center device object, Step 305 further includes that the driver stores the first device object as a paired device object.

Correspondingly, before the driver obtains the peripheral device object via the IOS system, Step 302 further includes:

Step k1: the driver determines whether the paired device object exists and, if yes, disconnect the pairing with the device corresponding to the paired device object, clear the paired device object, and continue obtaining the peripheral device object via the IOS system after the driver clears the paired device object; otherwise, obtain the peripheral device object via the IOS system.

Specifically, the driver determines whether the paired device object exists in the second device list.

If the paired device object exists in the second device list, call a peripheral device disconnecting method of the IOS system to disconnect pairing with the device corresponding to the paired device object. After the driver obtains a disconnected device object from the IOS system via a peripheral device disconnecting delegate interface of the IOS system, the driver determines whether the disconnected device object matches the paired device object. After the driver determines that the disconnected device object matches the paired device object, the driver clears the paired device object in the second device list, keeps on obtaining the peripheral device via the IOS system. When the driver determines that the disconnected device object and the paired device object do not match, the driver returns error information to the application.

If the paired device object does not exist in the second device list, the driver obtains the peripheral device object via the IOS system directly.

The peripheral device disconnecting method of the IOS system is:
@interface CBCentralManager: NSObject
(void)disconnectPeripheral:(CBPeripheral*)peripheral
@end The peripheral device disconnecting delegate interface of the IOS system is:
@interface CBCentralManager: NSObject
(void)centralManager:(CBCentralManager*)central didDisconnectPeripheral:(CBPeripheral*)aPeripheral error:(NSError *)error
@end
where the parameter aPeripheral is the disconnected device object.

After the driver stores the first device object or the second device object as the paired device object, in Step 304, before the driver obtains the first device object according to the target device identification in Step 304, Step 304 further includes:
the driver determines whether the target device identification matches the paired device object and, if yes, executes Step 309; otherwise, obtains the first device object according to the target device identification, and continue the procedure.

Specifically, the driver determines whether the target device identification matches the device identification of the paired device object in the second device list and, if yes, executes Step 309; otherwise, obtains the first device object according to the target device identification, continue the procedure.

It should be noted that, after Step 301, the method further includes: after the driver obtains a device releasing request including the successful initializing identification from the application, clearing the successful initializing identification.

Specifically, after the driver obtains a fourth input information of the application via a resource manager function releasing interface, determine whether the fourth input information matches the successful initializing identification and, if yes, clear the successful initializing identification and the target feature, and return a first successful releasing identification to the application; otherwise, return error information to the application via the resource manager function releasing interface.

The resource manager function releasing interface is: SCardReleaseContext(long hContext); where the parameter hContext is the fourth input information.

After the driver obtains a card releasing request including the successful connecting identification from the application, the driver clears the successful connecting identification.

Specifically, after the driver obtains fifth input information from the application via a smart card function disconnecting interface, the driver determines whether the fifth input information matches the successful connecting identification and, if yes, clears the successful connecting identification and returns a second successful releasing identification to the application; otherwise, returns error information to the application via the smart card function disconnecting interface.

In this case, the smart card function disconnecting interface is:
LONG SCardDisconnect(SCARDHANDLE hCard, DWORD dwDisposition); where the parameter hCard is the fifth input information.

In the present embodiment, the first successful releasing identification and the second successful releasing identification can be the same.

Embodiment 4

Figure 4:
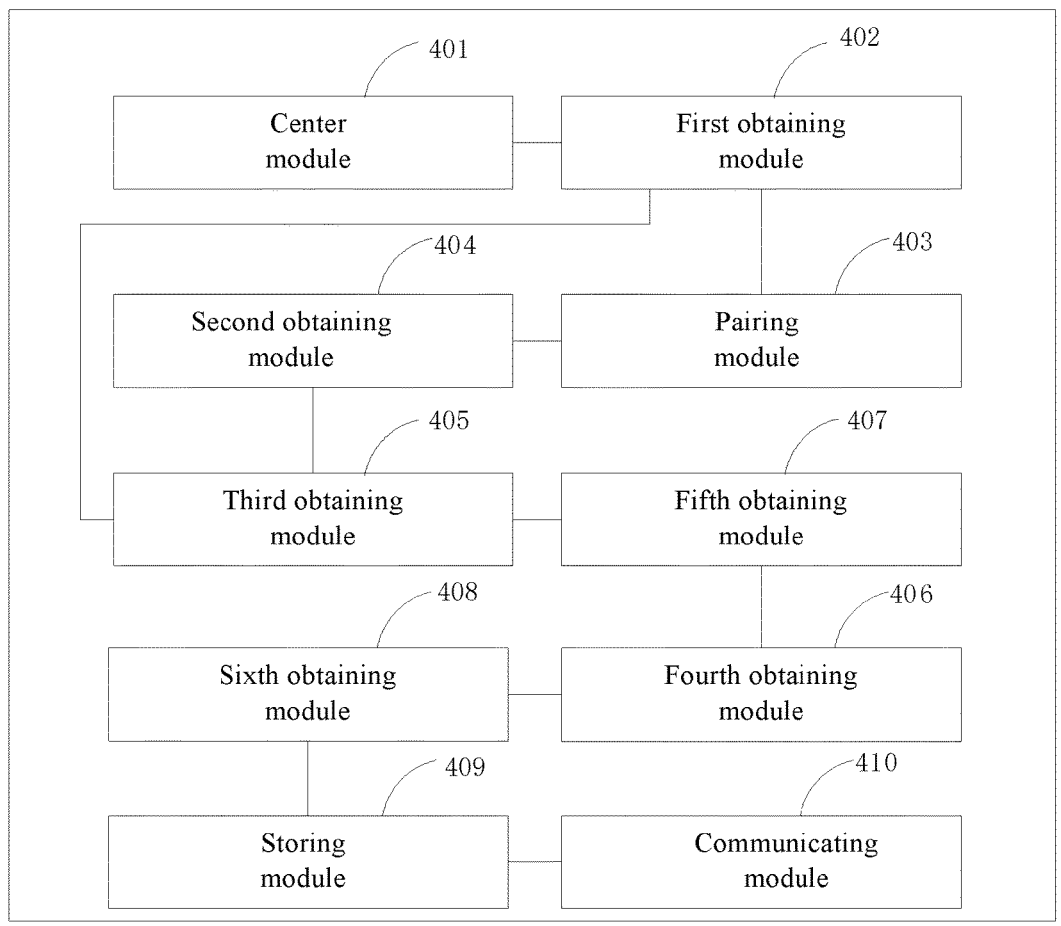
FIG. 4 is a flowchart of a method of Bluetooth communication provided by Embodiment 1 of the present disclosure.

Embodiment 4 provides a communication device. FIG. 4 is a structural diagram of the communication device provided by Embodiment 4 of the present disclosure. Specifically, as shown by FIG. 4, the communication device includes: a center module 401, a first obtaining module 402, a pairing module 403, a second obtaining module 404, a third obtaining module 405, a fourth obtaining module 406, a fifth obtaining module 407, a sixth obtaining module 408, a storing module 409 and a communicating module 410, where:
the center module 401 is configured to initialize a center device object;
the first obtaining module 402 is configured to obtain a first device object according to the center device object initialized by the center module 401;
the first obtaining module 402 is specifically configured to use the center device initialized by the center module 401 to send a device searching request to obtain a first device object from the IOS system.
the paring module 403 is configured to pair a corresponding target Bluetooth device according to the device object obtained by the first obtaining module 402;
the pairing module 403 is specifically configured to pair with the corresponding target Bluetooth device corresponding to the first device object obtained by the first obtaining module 402 via the IOS system;
the second obtaining module 404 is configured to obtain a second device object after the pairing module 403 pairs with the corresponding target Bluetooth device according to the first device object obtained by the first obtaining module 402;
the second obtaining module 404 is specifically configured to obtain the second device object from the IOS system after the pairing module 403 pairs with the target Bluetooth device corresponding to the first device object obtained by the first obtaining module 402 via the IOS system;
the third obtaining module 405 is configured to, after the second obtaining module 404 obtains the second device object, obtain a third device object according to the second device object or the first device object obtained by the first obtaining module 402;

the third obtaining module 405 is specifically configure to, after the second obtaining module 404 obtains the second device object, use the first device object obtained by the first obtaining module 402 or the second device object obtained by the second obtaining module 404 to send a device service obtaining request to the IOS system, and obtain a third device object from the IOS system;

the fifth obtaining module 407 is configured to obtain a target service corresponding to a preset service identification from the third device object obtained by the third obtaining module 405;

the fifth obtaining module 407 is specifically configured to obtain the target service corresponding to the preset service identification from the third device object from the IOS system obtained by the third obtaining module 405;

the fourth obtaining module 406 is configured to obtain a first service according to the target service obtained by the fifth obtaining module 407;

the fourth obtaining module 406 is specifically configured to send a device feature obtaining request to the IOS system, obtain a first service of the IOS system, where the obtaining the device feature request includes the target service obtained by the fifth obtaining module 407;

the sixth obtaining module 408 is configured to obtain a target feature corresponding to a preset feature identification from the first service obtained by the fourth obtaining module 406;

the storing module 409 is configured to store the target feature obtained by the sixth obtaining module 408;

the communicating module 410 is configured to use the target feature stored by the storing module 409 to communicate with the target Bluetooth device; and the communicating module 410 is specifically configured to use the target feature stored by the storing module 409 to communicate with the target Bluetooth device via the IOS system.

In the present embodiment, the first obtaining module 402 can specifically include a first obtaining unit, a second obtaining unit and a device identification outputting unit.

The first obtaining unit is configured to: obtain corresponding peripheral device objects corresponding to a plurality of Bluetooth devices according to the center device object initialized by the center module 401; obtain a corresponding peripheral device object corresponding to a target device identification selected by a user after the device identification outputting unit outputs the device identification of the peripheral device object obtained by the first obtaining unit; take the peripheral device object corresponding to the target device identification as the first device object; obtain the peripheral device object corresponding to the target device identification selected by the user, and take the peripheral device object corresponding to the target device identification as the first device object.

The device identification outputting unit is configured to obtain the device identification of the peripheral device object obtained by the first obtaining unit.

The storing module 409 is further configured to store the peripheral device object obtained by the first obtaining unit.

In the present embodiment, the communication device can further include: a first determining module, a second determining module and an error reporting module. Accordingly:

the first determining module is configured to, after the third obtaining module 405 obtains the third device object, determine whether the target service corresponding to the preset service identification exists in the third device object;

the fifth obtaining module 407 is specifically configured to, after the first determining module determines that the result is yes, obtain the target service corresponding to the preset service identification from the third device object obtained by the third obtaining module 405;

the second determining module is configured to, after the fourth obtaining module 406 obtains the first service, determine whether the target feature corresponding to the preset feature identification exists in the first service;

the storing module 409 is specifically configured to, after the second determining module determines result is yes, store the target feature obtained by the sixth obtaining module 408.

The error reporting module is configured to, after the first determining module determines result is no, report error, and, after the second determining module determines result is no, report error.

In the present embodiment, the storing module 409 is further configured to, after the second obtaining module 404 obtains the second device object, take the first device object or the second device object as a paired device object and store the paired device object.

If the storing module 409 is further configured to, after the second obtaining module 404 obtains the second device object, take the first device object or the second device object as a paired device object and store the paired device object, the communication device can correspondingly further include a third determining module, a first disconnecting module and the first clearing module, where the third determining module is configured to, before the first obtaining module 402 obtains a first device object according to the center device, determine whether a paired device object exists in the storing module 409;

the first determining module is configured to, after the third determining module determines that the paired device object exists in the storing module 409, disconnect pairing with the Bluetooth device corresponding to the paired device object;

the first clearing module is configured to, after the first disconnecting module disconnects the pairing with the Bluetooth device corresponding to the paired device object, clear the paired device object stored in the storing module 409; and the first obtaining module 402 is specifically configured to, after the first clearing module clears the paired device object stored in the storing module 409, obtain the first device object according to the center device; and after the third determining module determines that the paired device object does not exist in the storing module 409, obtain the first device object according to the center device object.

If the storing module 409 is further configured to, after the second obtaining module 404 obtains the second device object, take the first device object or the second device object as the paired device object and store the paired device object, the communication device can further include a fourth determining module and a fifth determining module, where the fourth determining module is configured to, before the pairing module 403 pairs with the Bluetooth device corresponding to the first device object, determine whether a paired device object exists in the storing module 409;

the fifth determining module is configured to, after the fourth determining module determines the result is yes, determine whether the first device object matches the paired device;

the pairing module 403 is specifically configured to, after the fifth determining module determines that the result is no, pair with the target Bluetooth device corresponding to the first device object; after the fourth determining module determines that the result is no, pair with the target Bluetooth device corresponding to the first device object;

the communicating module 410 is further configured to, when the fifth determining module determines that the result is yes, use the target feature stored by the storing module 409 to communicate with the target Bluetooth device.

In the present embodiment, the center module 401 is specifically configured to create a center device object and set a center delegate interface in the IOS system.

The creating a center device object can be:
CBCentralManager *manager
manager=[[CBCentralManager alloc] init];

The setting the center delegate interface in the IOS system according to the center device object can be:
(instanceType)initWithDelegate:
(id<CBCentralManagerDelegate>)delegate queue:(dispatch_queue_t)queue;

If the center module 401 is specifically configured to create the center device object, set the center delegate interface in the IOS system according to the center device object, the first obtaining module 402 can further specifically be configured to, after the center module 401 sets the center delegate interface in the IOS system according to the center device, obtain the first device object from the IOS system according to the center device object via the first delegate interface; the second obtaining module 404 can be specifically configure to, after the pairing module 403 pairs with the corresponding target Bluetooth device according to the first device object obtained by the first obtaining module 402, obtain a second device object from the IOS system via a second delegate interface.

If the center module 401 is specifically configured to create the center device object and set the center delegate interface in the IOS system according to the center device object, the first obtaining module 404 can be further specifically configured to, after the center module 401 creates the center device object, set the center delegate interface in the IOS system according to the center device object, use the center device object to call a peripheral device discovering method of the IOS system to send a device searching request to the IOS system, and obtain the first device object from the IOS system via the first delegate interface.

If the center module 401 is specifically configured to create the center device object, set the center delegate interface in the IOS system according to the center device object, the pairing module 403 can be specifically configured to use the center device to call a peripheral device connecting method of the IOS system and pair with the target Bluetooth device corresponding to the first device object obtained by the first obtaining module 402; the second obtaining module 404 can be further specifically configured to, after the pairing module 403 uses the center device to call a peripheral device connecting method of the IOS system and pairs the target Bluetooth device corresponding to the first device object obtained by the first obtaining module 402, obtain the second device object from the IOS system via the second delegate interface.

In the present embodiment, the communication device can further include a setting module. The setting module is configured to, before the third obtaining module 405 obtains the a third device object, set a peripheral delegate interface in the IOS system according to the first device object or the second device object.

Correspondingly, the third obtaining module 405 can be specifically configured to, after the setting module sets the peripheral delegate interface in the IOS system according to the first device object or the second device object, obtain a third device object from the IOS system via the third delegate interface; and the fourth obtaining module 406 can be specifically configured to obtain a first service of the IOS system via the fourth delegate interface according to the target service obtained by the fifth obtaining module 407.

Correspondingly, the third obtaining module 405 can be specifically configured to, after the second obtaining module 404 obtains the second device object, use the first device object or the second device object to call a peripheral device service discovering method of the IOS system to send a device service obtaining request, and obtain the third device object from the IOS system via the third delegate interface.

Correspondingly, the fourth obtaining module 406 can be specifically configured to use the first device object or the second device object or the third device object to call the peripheral device feature discovering method of the IOS system to send a device feature obtaining request to the IOS system; and obtain a first service matching the preset service identification of the IOS system via the fourth delegate interface, where the device feature obtaining request includes the target service obtained by the fifth obtaining module 407. In the present embodiment, the first obtaining module 402 can be specifically configured to obtain the peripheral device objects corresponding to the plurality of Bluetooth devices respectively according to the center device object, and take the first peripheral device object of the peripheral device objects stored by the storing module 409 as the first device object.

The storing module 409 is further configured to store the peripheral device object obtained by the first obtaining module 402.

When the first obtaining module 402 is specifically configured to obtain the peripheral device objects corresponding to the plurality of Bluetooth devices respectively according to the center device object, take the first peripheral device object of the peripheral device objects stored by the storing module 409 as the first device object, where the communication device can further include a sixth determining module and a seventh obtaining module.

The sixth determining module is specifically configured to, after the third obtaining module 405 obtains the third device object, determine whether the target service corresponding to the preset service identification exists in the third device object.

The fifth obtaining module 407 is specifically configured to, after the sixth determining module determines that the result is yes, obtain the target service corresponding to the preset service identification in the third device object obtained by the third obtaining module 405.

The seventh obtaining module is configured to, after the sixth determining module determines that the result is no, take a next peripheral device object of the first device object as the first device object.

The configuring module 403 is further configured to pair with the Bluetooth target device corresponding to the first device object obtained by the seventh obtaining module.

Embodiment 5

The present embodiment provides a communication device, comprising: a center module, a first obtaining module, a pairing module, a second obtaining module, a third obtaining module, a fourth obtaining module, a fifth obtaining module, a sixth obtaining module, a storing module and a communicating module, where the center module is configured to initialize a center device object; and the center module is specifically configured to create the center device object, and set a center delegate interface of the IOS system according to the center device.

The creating the cetern device object can be:
CBCentralManager *manager
manager=[[CBCentralManager alloc] init];

The setting the center delegate interface of the IOS system according to the center device can be:
(instanceType)initWithDelegate:
(id<CBCentralManagerDelegate>)delegate queue:(dispatch_queue_t)queue;

The first obtaining module is configured to obtain a first device object according to the center device initialized by the center module.

The first obtaining module is specifically configured to, after the center module creates the center device object and sets the center delegate interface in the IOS system according to the center device object, use the center device object to call a peripheral device discovering method of the IOS system to send a device searching request to the IOS system, and obtain a first device object from the IOS system via a first delegate interface.

In the present embodiment, the peripheral device discovering method can be:
@interface CBCentralManager: NSObject
(void)scanForPeripheralsWithServices:
(NSArray*)serviceUUIDs options:
(NSDictionary *)options;
@end In the present embodiment, the device service obtaining request can further include a preset service identification.

In the present embodiment, the first delegate interface can be a peripheral device discovering delegate interface of the IOS system:
@protocol CBCentralManagerDelegate<NSObject>
@optional
(void)centralManager:
(CBCentralManager*)centraldidDiscoverPeripheral:
(CBPeripheral*)peripheraladvertisementData:
(NSDictionary*)advertisementData RSSI:(NSNumber *)RSSI;
@end The pairing module is configured to pair with a corresponding target Bluetooth device according to the first device object obtained by the first obtaining module.

The pairing module is specifically configured to use the center device object to call a peripheral device connecting method of the IOS system and pair with the target Bluetooth device corresponding to the first device object obtained by the first obtaining module. In the present embodiment, the peripheral device connecting method of the IOS system can be:
@interface CBCentralManager: NSObject
(void)connectPeripheral:(CBPeripheral*)peripheral
options:(NSDictonary*)options;
@end The second obtaining module is configured to, after the pairing module pairs with the corresponding target Bluetooth device according to the first device object obtained by the first obtaining module, obtain a second device object.

The second obtaining module is specifically configured to, after the pairing module pairs with the target Bluetooth device corresponding to the first device object via the IOS system, obtain the second device object from the IOS system via a second delegate interface.

In the present embodiment, the second delegate interface can be a peripheral device connecting delegate interface of the IOS system:
@protocol CBCentralManagerDelegate<NSObject>
@optional
(void)centralManager:(CBCentralManager*)cental didConnectPeripheral:(CBPeripheral *)aPeripheral;
@end The third obtaining module is configured to, after the second obtaining module obtains a second device object, obtain the first device object according to the second device object or the first obtaining module, and obtain a third device object.

The third obtaining module is specifically configured to, when a second obtaining module obtains the second device object from the IOS system, use the first device object or the second device object to call a peripheral device service discovering method of the IOS system to send a device service obtaining request to the IOS system, and obtain the third device object from the IOS system via a third delegate interface.

In the present embodiment, the method of finding the peripheral device service method of the IOS system is:
@interface CBPeripheral: CBPeer
(void)discoverServices:(NSArray*)serviceUUIDs;
@end In the present embodiment, the device service obtaining request can further include a service identification. Specifically, the parameter serviceUUIDs is set as the preset service identification.

The third delegate interface can be the peripheral device service discovering delegate interface of the IOS system:
@protocol CBPeripheralDelegate<NSObject>
@optional
(void)peripheral:(CBPeripheral*)peripheral didDiscoverServices:(NSError *)error;
@end The fifth obtaining module is configured to obtain the target service corresponding to the preset service identification from the third device object obtained by the third obtaining module.

The fourth obtaining module is configured to obtain the first service according to the target service obtained by the fifth obtaining module.

The fourth obtaining module specifically is configured to use the first device object or the second device object or the third device object to call a peripheral device feature discovering method of the IOS system to send a device feature obtaining request to the IOS system; and obtain a first service matching the preset service identification of the IOS system via a fourth delegate interface.

The peripheral device feature discovering method of the IOS system can be: @interface CBPeripheral: CBPeer
(void)discoverCharacteristics:(NSArray*)characteristicUUIDs forService:(CBService *)service;
@end In the present embodiment, the fourth delegate interface can be the peripheral device feature discovering delegate interface:
@protocol CBPeripheralDelegate<NSObject>
@optional
(void)peripheral:(CBPeripheral*)peripheral didDiscoverCharacteristicForService:(CBService*)service error:(NSError *)error;
@end The sixth obtaining module is configured to obtain a target feature corresponding to a preset feature identification from the first service obtained by the fourth obtaining module.

The storing module is configured to store the object feature obtained by the sixth obtaining module.

The communicating module is configured to use the target feature stored by the storing module to communicate with the target Bluetooth device.

In the present embodiment, the first obtaining module can specifically include a first obtaining unit, a second obtaining unit and a device identification outputting unit, where the first obtaining unit is configured to obtain peripheral device objects corresponding to a plurality of Bluetooth devices of the IOS system according to the center device object initialized by the center module; and obtain the first device object corresponding to the target device identification selected by the user after the device identification outputting unit outputs the device identification of the peripheral device object obtained by the first obtaining unit;

the device outputting unit is configured to output the device identification of the peripheral device object obtained by the first obtaining unit; and the storing module is further configured to store the peripheral device object obtained by the firs obtaining unit.

In the present embodiment, the communication device further includes: a first determining module, a second determining module and an error reporting module. Accordingly:

the first determining module is configured to, after the third obtaining module obtains a third device object from the IOS system, determine whether the target service corresponding to the preset service identification exists in the third device object;

the fifth obtaining module is specifically configured to, after the first determining module determines that the result is yes, obtain the target service corresponding to the preset service identification from the third device object obtained by the third obtaining module;

the second determining module is configured to, after the fourth obtaining module obtains the first service from the IOS system, determine whether the target feature corresponding to the preset feature identification exists in the first service;

the storing module is specifically configured to, after the second determining module determines that the result is yes, store the target feature obtained by the sixth obtaining module; and the error reporting module is configured to report error after the first determining module determines that the result is no, and report error after the second determining module determines that the result is no.

In the present embodiment, the storing module is further configured to, after the second obtaining module obtains the second device object from the IOS system, take the first device object or the second device object as paired device object and store the paired device object.

If the storing module is further configured to, after the second obtaining module obtains the second device object from the IOS system, take the first device object or the second device object as a paired device object and store the paired device object, the communication device can correspondingly further includes a third determining module, a first disconnecting module and a first clearing module.

The third determining module is configured to, before the first obtaining module sends the device searching request to the IOS system according to the center device object, determine whether a paired device object exists in the storing module.

The first disconnecting module is configured to, after the third determining module determines that the paired device object exists in the storing module, disconnect pairing with the Bluetooth device corresponding to the paired device object.

The first clearing module is configured to, after the disconnecting module disconnects pairing with the Bluetooth device corresponding to the paired device object, clear the paired device object stored in the storing module.

The first obtaining module is specifically configured to, after the first clearing module clears the paired device object stored in the storing module, send the device searching request to the IOS system according to the center device object, obtain the first device object from the IOS system via the first delegate interface; and, after the third determining module determines that the paired device object does not exist in the storing module, send the device searching request to the IOS system according to the center device object, and obtain the first device object from the IOS system via the first delegate interface.

If the storing module is further configured to, after the second obtaining module obtains the second device object from the IOS system, take the first device object or the second device object as the paired device object and store the paired device object, the communication device can further include a fourth determining module and a fifth determining module.

The fourth determining module is configured to, before the pairing module pairs with the target Bluetooth device corresponding to the first device object via the IOS system, determine whether the paired device object exists in the storing module, where the fifth determining module is configured to, after the fourth determining module determines that the result is yes, determine whether the first device object matches the paired device;

the pairing module is configured to, after the fifth determining module determines that the result is no, pair with the target Bluetooth device corresponding to the first device object via the IOS system; and after the fourth determining module determines that the result is no, pair with the target Bluetooth device corresponding to the first device object via the IOS system; and the communicating module is further configured to, after the fifth determining module determines that the result is yes, use the target feature stored by the storing module to communicate with the target Bluetooth device via the IOS system.

In the present embodiment, the communication device further includes a setting module. The setting module is configured to, before the third obtaining module sends the device service obtaining request to the IOS system, set the peripheral delegate interface in the IOS system according to the first device object or the second device object.

In the present embodiment, the preset feature identification can specifically include a preset reading feature identification and a preset writing feature identification. The target feature specifically includes target reading feature and target writing feature.

When the preset feature identification specifically includes the preset reading feature identification and the preset writing feature identification; the target feature can specifically include the target reading feature and the target writing feature, correspondingly:

the sixth obtaining module is specifically configured to, after the fourth obtaining module obtains a first service from the IOS system, obtain the target reading feature corresponding to the preset reading feature identification and the target writing feature corresponding to the preset writing feature identification in the first service.

The storing module is specifically configured to store the target reading feature and the target writing feature obtained by the sixth obtaining module.

The communicating module is specifically configured to use the target reading feature and the target writing feature stored by the storing module to communicate with the target Bluetooth device via the IOS system.

When the preset feature identification specifically includes the preset reading feature identification and the preset writing feature identification; the target feature can specifically include the target reading feature and the target writing feature, and the communication module is further configured to, before using the target reading feature stored by the storing module via the IOS system to communicate with the target Bluetooth device, open a reading channel identification for the target reading feature.

In the present embodiment, the first obtaining module is specifically further configured to, after obtaining the peripheral device objects corresponding to the plurality of Bluetooth devices from the IOS system, take the first peripheral device object in the peripheral device objects stored by the storing module as the first device object.

The storing module is further configured to store the peripheral device object obtained by the first obtaining module.

When the first obtaining module is specifically further configured to, after obtaining the peripheral device objects corresponding to the plurality of Bluetooth devices from the IOS system, take the first peripheral device object in the peripheral device objects stored by the storing module as the first device object, and the communication device can further include a sixth determining module and a seventh determining module.

The sixth determining module is specifically configured to, after the third obtaining module obtains the third device object from the IOS system, determine whether the target device corresponding to the preset service identification exists in the third device object.

The fifth obtaining module is specifically configured to, when the sixth determining module determines that the result is yes, obtain the target service corresponding to the preset service identification from the third device object obtained by the third obtaining module.

The seventh obtaining module is configured to, when the sixth determining module determines that the result is no, take a next peripheral device of the first device object as the first device object.

The pairing module is further configured to pair with the target Bluetooth device corresponding to the first device object obtained by the seventh obtaining module via the IOS system.

In the present embodiment, the communication device further includes an eighth obtaining module, a generating module and a returning module. Accordingly:

the eighth obtaining module is configured to obtain an initializing request, a device identification obtaining request, a device connecting request and a communicating request, where the device identification obtaining request includes a successful initializing identification generated by the generating module, and the communicating request includes communication instruction and a successful connecting identification generated by the generating module;

the generating module is configured to, after the eighth obtaining module obtains the initializing request from the application, generate the successful initializing identification; and, after the storing module stores the target feature obtained by the sixth obtaining module, generate the successful connecting identification;

the storing module is further configured to store the successful initializing identification and the successful connecting identification generated by the generating module;

the center module is specifically configured to, after the eighth obtaining module obtains the initializing request from the application and before the first obtaining module sends the device searching request to the IOS system according to the center device object, initialize the center device object;

the first obtaining module is specifically configured to, when the eighth obtaining module obtains the device identification obtaining request from the application, send the device searching request to the IOS system according to the center device object; obtain the peripheral device object corresponding to each Bluetooth device of the IOS system; and, after the eighth obtaining module obtains the device connecting request from the application, obtain the first device object corresponding to the target device identification from the peripheral device object;

the communicating module is specifically configured to, after the eighth obtaining module obtains the communicating request from the application, use the target feature stored by the storing module to obtain a communication instruction response by communicating with the target Bluetooth device via the IOS system; and the returning module is configured to return a successful initializing identification generated by the generating module; return the device identification of the peripheral device object obtained by the first obtaining module; after the storing module stores the target feature obtained by the sixth obtaining module, return the successful connecting identification to the application; and return the communication instruction response obtained by the communicating module to the application.

In the present embodiment, the communication device further includes a card powering up module.

The card powering up module is configured to, before the returning module returns the successful connecting identification to the application, use the sixth obtaining module to send a powering up card instruction to the target Bluetooth device to obtain a card powering up response via the IOS system.

In the present embodiment, the communication device further includes a first releasing module, where the eighth obtaining module is further configured to obtain a device releasing request including the successful initializing identification form the application;

the first releasing module is configured to, after the eighth obtaining module obtains the device releasing request including the successful initializing identification from the application, clear the successful initializing identification and the target feature in the storing module; and the returning module is further configured to, after the first releasing module clears the successful initializing identification and the target feature in the storing module, return a first successful releasing identification to the application.

In the present embodiment, the communication device can further include a second releasing module, where the eighth obtaining module is further configured to obtain a card releasing request, which includes the successful connecting identification, from the application;

the second releasing module is configured to, after the eighth obtaining module obtains the card releasing request including the successful connecting identification from the application, and clear the successful connecting identification in the storing module;

the returning module is further configured to, after the second releasing module clears the successful connecting identification in the storing module, return the second successful releasing identification to the application.

It should be noted that, the first device object, the second device object and the third device object correspond to the target Bluetooth device in the present embodiment. The first device object, the second device object and the third device object can be the same or different, the first service and the target service can be the same or different. The center delegate interface includes: a first delegate interface, the second delegate interface and the fifth delegate interface. The peripheral delegate interface includes: the third delegate interface, the fourth delegate interface and the sixth delegate interface.

In the several embodiments provided in this application, it should be understood that the disclosed system, device, and method can be implemented in other manners. For example, the described device embodiments are merely exemplary. For example, the unit division is merely logical function division, and there can be other division manners in actual implementations. For example, multiple units or components can be combined, or can be integrated into another system, or some features can be ignored or not performed. Furthermore, the shown or discussed coupling or direct coupling or communication connection can be accomplished through some interfaces, and indirect couplings or communication connections between devices or units, and can be electrical, mechanical, or in other forms.

Units described as separate components may or may not be physically separated. Components shown as units may or may not be physical units, that is, they can be located in one place or be distributed to a plurality of network units. Part or all of the modules can be selected to achieve the objective of the solution in the embodiment according to actual requirements.

In addition, functional units in each embodiment of the present disclosure can be integrated into one processing module, or each unit can exist physically separated, or two or more units can also be integrated into one unit. The integrated unit above can be implemented in form of hardware and the integrated unit above can be implemented in the form of hardware and software function unit.

If the functions are implemented in a form of a software functional unit, the functions can be stored in a computer readable storage medium. The computer software product can be stored in a storage medium, and include several instructions for causing a computer device (for example, a personal computer, a server, or a network device) or a processor to perform part of the steps of the methods described in the embodiments of the present disclosure. The storage medium includes various non-transitory media capable of storing program codes, such as a flash disk, a mobile hard disk, a Read-Only Memory (ROM, Read-Only Memory), a Random Access Memory (RAM, Random Access Memory), a magnetic disk or an optical disk.

Persons skilled in the art can clearly understand that, for the purpose of convenient and brief description, the separations of respective functional modules above are for example only. In real practice, the above functions can be allocated to different functional modules as needed, i.e., the internal structure of the device may be divided into different functional modules to complete part or all of the functions described above. For a detailed working process of the devices described above, reference can be made to the corresponding process in the foregoing method embodiments, and the details will not be described herein again.

Finally, it should be noted that the above embodiments are merely intended to explain, rather than to limit, various technical solutions of the present disclosure described above. Although the present disclosure has been explained in detail with reference to the foregoing embodiments, those of skill in the art should appreciate that modifications can still be made to the technical solutions recorded in the embodiments described hereinabove, or equivalent substitutions are still possible for part or all of the technical features therein, without causing the essence of the corresponding technical solution to deviate from the scope of various embodiment technical solutions of the present disclosure.

What is claimed is:

1. A method of Bluetooth communication, comprising:
   Step s1, initializing a center device object, and obtaining a first device object according to the center device object;
   Step s2, pairing with a corresponding target Bluetooth device according to the first device object, and obtaining a second device object;
   Step s3, obtaining a third device object according to the first device object or the second device object, and obtaining a target service corresponding to a preset service identification from the third device object; and
   Step s4, obtaining a first service according to the target service, obtaining a target feature corresponding to the preset feature identification from the first service, storing the target feature, and using the target feature to communicate with the target Bluetooth device.

2. The method of claim 1, wherein the obtaining a first device object according to the center device object comprises:
   using the center device object to send a device searching request to an IOS system to obtain the first device object from the IOS system;
   Step s2 specifically comprises:
   pairing with the target Bluetooth device corresponding to the first device object via the IOS system, and obtaining the second device object from the IOS system;
   Step s3 specifically comprises:
   after obtaining the second device object from the IOS system, using the first device object or the second device object to send a device service obtaining request to the IOS system, obtaining the third device object from the IOS system; after obtaining the third device object from the IOS system, and obtaining the target service corresponding to the preset service identification from the third device object, the device service obtaining request comprising the preset service identification; and
   Step s4 specifically comprises:
   sending a device feature obtaining request to the IOS system, the device feature obtaining request comprising the target service; after obtaining the first service from the IOS system, obtaining the target feature corresponding to the preset feature identification in the first service, storing the target feature, and using the target feature to communicate with the target Bluetooth device via the IOS system, the device feature obtaining request further comprising the preset feature identification.

3. The method of claim 1, wherein the obtaining the first device object according to the center device object comprises:

obtaining peripheral device objects which correspond to a plurality of the Bluetooth devices respectively, storing the peripheral device objects which correspond to the plurality of the Bluetooth devices respectively, outputting device identifications of the peripheral device objects which correspond to the plurality of the Bluetooth devices; after obtaining a target device identification selected by a user, obtaining the peripheral device object corresponding to the target device identification, and taking the peripheral device object corresponding to the target device identification as the first device object.

4. The method of claim 1, wherein before the obtaining the target service corresponding to the preset service identification from the third device object, the method further comprises:

determining whether the target service corresponding to the preset service identification exists in the third device object and, if yes, obtaining the target service corresponding to the preset service identification from the third device object, and executing Step s4; otherwise, reporting error; and before the obtaining the target feature corresponding to the preset feature identification from the first service, the method further comprises:

determining whether the target feature corresponding to the preset feature identification exists in the first service and, if yes, obtaining the target feature corresponding to the preset feature identification from the first service, and continuing operating; otherwise, reporting error.

5. The method of claim 1, wherein the initializing the center device object comprises:

creating the center device object, and setting a center delegate interface in the IOS system according to the center device object;

Step s1 specifically comprises:

initializing the center device object, using the center device object to call a peripheral device discovering method of the IOS system to send the device searching request to the IOS system; obtaining the first device object from the IOS system via a first delegate interface, and executing Step s2; and Step s2 specifically comprises:

using the center device object to call a peripheral device connecting method of the IOS system to pair with the target Bluetooth device corresponding to the first device object;

obtaining the second device object from the IOS system via a second delegate interface, and executing Step s3.

6. The method of claim 1, wherein, before Step s3, the method further comprises:

setting a peripheral delegate interface in the ISO system according to the first device object or the second device object;

Step s3 specifically comprises;

using the first device object or the second device object to call a peripheral device service discovering method of the IOS system to send the device service obtaining request to the IOS system; obtaining the third device object from the IOS system via the third delegate interface, and obtaining the target service corresponding to the preset service identification in the third device object; and Step s4 specifically comprises:

using the first device object or the second device object or the third device object to call a peripheral device feature discovering method of the IOS system to send a device feature obtaining request to the IOS system, the device feature obtaining request comprising the target service; after obtaining the first service from the IOS system via a fourth delegate interface, obtaining the target feature corresponding to the preset feature identification from the first service, storing the target feature, using the target feature to communicate with the target Bluetooth device via the IOS system.

7. The method of claim 1, wherein the preset feature identification specifically comprises a preset reading feature identification and a preset writing feature identification; the target feature specifically comprises: a target reading feature and a target writing feature, and Step s4 specifically comprises:

obtaining the first service according to the target service, obtaining the target reading feature corresponding to the preset reading feature identification and the target writing feature corresponding to the preset writing feature identification, storing the target reading feature and the target writing feature, and using the target reading feature and the target writing feature to communicate with the target Bluetooth device.

8. The method of claim 1, wherein the obtaining the first device object according to the center device object comprises:

obtaining peripheral device objects which correspond to the plurality of the Bluetooth devices according to the center device object, storing the peripheral device objects, and taking the first peripheral device object in the stored peripheral device objects as the first device object.

9. The method of claim 2, wherein the device searching request comprises the preset service identification.

10. A communication device, comprising: a center module, a first obtaining module, a pairing module, a second obtaining module, a third obtaining module, a fourth obtaining module, a fifth obtaining module, a sixth obtaining module, a storing module and a communicating module, wherein the center module is configured to initialize a center device object;

the first obtaining module is configured to obtain a first device object according to the center device object initialized by the center module;

the paring module is configured to pair with a corresponding target Bluetooth device according to the first device object obtained by the first obtaining module;

the second obtaining module is configured to obtain a second device object after the pairing module pairs with the corresponding target Bluetooth device according to the first device object obtained by the first obtaining module;

the third obtaining module is configured to, after the second obtaining module obtains the second device object, obtain a third device object according to the second device object or the first device object obtained by the first obtaining module;

the fifth obtaining module is configured to obtain a target service corresponding to a preset service identification from the third device object obtained by the third obtaining module;

the fourth obtaining module is configured to obtain a first service according to the target service obtained by the fifth obtaining module;

the sixth obtaining module is configured to obtain a target feature corresponding to a preset feature identification from the first service obtained by the fourth obtaining module;

the storing module is configured to store the target feature obtained by the sixth obtaining module; and the communicating module is configured to use the target feature stored by the storing module to communicate with the target Bluetooth device.

11. The communication device of claim 10, wherein the first obtaining module is specifically configured to: use the center device initialized by the center module to send a device searching request to the IOS system to obtain the first device object;

the pairing module is specifically configured to pair with a target Bluetooth device corresponding to the first device object obtained by the first obtaining module via the IOS system;

the second obtaining module is specifically configured to, after the pairing module pairs with the target Bluetooth device corresponding to the first device object obtained by the first obtaining module via the IOS system, obtain a second device object from the IOS system;

the third obtaining module is specifically configured to, after the second obtaining module obtains the second device object, use the first device object obtained by the first obtaining module, or the second device object obtained by the second obtaining module, to send a device service obtaining request to the IOS system; and obtain the third device object from the IOS system, the device service obtaining request comprising the preset service identification;

the fifth obtaining module is specifically configured to obtain the target service corresponding to the preset service identification from the third device object obtained by the third obtaining module from the IOS system;

the fourth obtaining module is specifically configured to: send a device feature obtaining request to the IOS system; obtain a first service from the IOS system, the device feature obtaining request comprising the target service obtained by the fifth obtaining module, and the device feature obtaining request further comprising the preset feature identification; and the communicating module is specifically configured to use the target feature stored by the storing module to communicate with the target Bluetooth device via the IOS system.

12. The communication device of claim 10, wherein the first obtaining module specifically comprises: a first obtaining unit, a second obtaining unit and a device identification outputting unit;

the first obtaining unit is configured to: obtain peripheral device objects corresponding respectively to a plurality of the Bluetooth devices according to the center device object initialized by the center module; and, after the device identification outputting unit outputs device identifications of the peripheral device objects obtained by the first obtaining unit, obtain a peripheral device object corresponding to a target device identification selected by the user; and take the peripheral device object corresponding to the target device identification as the first device object;

the device identification outputting unit is configured to obtain the device identifications of the peripheral device objects obtained by the first obtaining unit; and the storing module is further configured to store the peripheral device objects obtained by the first obtaining unit.

13. The communication device of claim 10, further comprising: a first determining module; a second determining module; and an error reporting module, wherein the first determining module is configured to, after the third obtaining module obtains the third device object, determine whether the target service corresponding to the preset service identification exists in the third device object;

the fifth obtaining module is specifically configured to, after the first determining module determines the result is yes, obtain the target service corresponding to the preset service identification from the third device object;

the second determining module is specifically configured to, after the fourth obtaining module obtains the first service, determine whether the target feature corresponding to the preset feature identification exists in the first service;

the storing module is specifically configured to, after the second determining module determines the result is yes, store the target feature obtained by the sixth obtaining module; and the error reporting module is configured to, after the first determining module determines the result is no, report error; and, after the second determining module determines the result is no, report error.

14. The communication device of claim 10, wherein the center module is specifically configured to create the center device object and set a center delegate interface in the IOS system according to the center device object; the first obtaining module is specifically configured to, after the center module creates the center device object and set the center delegate interface in the IOS system according to the center device object, use the center device object to call a peripheral device discovering method of the IOS system to send a device searching request to the IOS system and obtain the first device object from the IOS system via a first delegate interface;

the pairing module is specifically configured to use the center device object to call a peripheral device connecting method of the IOS system to pair with the target Bluetooth device which corresponds to the first device object obtained by the first obtaining module; and the second obtaining module is specifically configured to, after the pairing module uses the center device object to call the peripheral device connecting method of the IOS system to pair with the target Bluetooth device corresponding to the first device object, obtain a second device object from the IOS system via a second delegate interface.

15. The communication device of claim 10, further comprising: a setting module, wherein the setting module is configured to, before the third obtaining module obtains a third device object, set a peripheral delegate interface in the IOS system according to the first device object or the second device object; the third obtaining module is specifically configured to, after the second obtaining module obtains the second device object, use the first device object or the second device object to call the peripheral device service discovering method of the IOS system to send the device service obtaining request to the IOS system, and obtain the third device object from the IOS system via a third delegate interface; and the fourth obtaining modules is specifically configured to use the first device object or the second device object or the third device object to call a peripheral device feature discovering method of the IOS system to send a device feature obtaining request to the IOS system; and obtain the first service matched the preset service identification of the IOS system via a fourth delegate interface, the device feature obtaining request comprising the target service obtained by the fifth obtaining module.

16. The communication device of claim 10, wherein the preset feature identification specifically comprises a preset reading feature identification and a preset writing feature identification; the target feature specifically comprises a target reading feature and a target writing feature, wherein
the sixth obtaining module is specifically configured to, after the fourth obtaining module obtains the first service, obtain the target reading feature corresponding to the preset reading feature identification and the target writing feature corresponding to the preset writing feature identification from the first service;
the storing module is specifically configured to store the target reading feature and the target writing feature obtained by the sixth obtaining module; and
the communicating module is specifically configured to use the target reading feature and the target writing feature stored by the storing module to communicate with the target Bluetooth device.

17. The communication device of claim 10, wherein the first obtaining module is specifically configured to, according to the center device object, obtain peripheral device objects corresponding respectively to the plurality of Bluetooth devices, and take the first peripheral device object in the peripheral device objects stored by the storing module as the first device object; and
the storing module is further configured to store the peripheral device objects obtained by the first obtaining module.

18. The communication device of claim 11, wherein the device searching request comprises a preset service identification.

* * * * *